(12) United States Patent
Serebrin et al.

(10) Patent No.: US 8,706,941 B2
(45) Date of Patent: *Apr. 22, 2014

(54) INTERRUPT VIRTUALIZATION

(71) Applicant: Advanced Micro Devices, Inc., Sunnyvale, CA (US)

(72) Inventors: Benjamin C. Serebrin, Sunnyvale, CA (US); Rodney W. Schmidt, Dripping Springs, TX (US); David A. Kaplan, Austin, TX (US); Mark D. Hummel, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,647

(22) Filed: Jun. 13, 2013

(65) Prior Publication Data

US 2013/0275638 A1    Oct. 17, 2013

Related U.S. Application Data

(63) Continuation of application No. 12/961,186, filed on Dec. 6, 2010, now Pat. No. 8,489,789.

(60) Provisional application No. 61/301,937, filed on Feb. 5, 2010.

(51) Int. Cl.
*G06F 13/24* (2006.01)
*G06F 13/32* (2006.01)

(52) U.S. Cl.
USPC ............................ 710/267; 710/260

(58) Field of Classification Search
USPC ................................ 710/260, 267
See application file for complete search history.

(56) References Cited

U.S. PATENT DOCUMENTS

| | | | |
|---|---|---|---|
| 5,222,215 | A | 6/1993 | Chou et al. |
| 5,892,957 | A | 4/1999 | Normoyle et al. |
| 6,332,169 | B1 | 12/2001 | Hagersten |
| 6,622,193 | B1 | 9/2003 | Avery |
| 6,799,231 | B2 | 9/2004 | Hsin et al. |
| 6,961,806 | B1 | 11/2005 | Agesen et al. |
| 6,977,908 | B2 | 12/2005 | De Azevedo et al. |

(Continued)

OTHER PUBLICATIONS

"Advanced Programmable Interrupt Controller (APIC)," Chapter 9, vol. 3, Sep. 2008, pp. 1-68.

(Continued)

*Primary Examiner* — Paul R. Myers
*Assistant Examiner* — Christopher a Daley
(74) *Attorney, Agent, or Firm* — Lawrence J. Merkel; Meyertons, Hood, Kivlin, Kowert & Goetzel, P.C.

(57) ABSTRACT

In an embodiment, a device interrupt manager may be configured to receive an interrupt from a device that is assigned to a guest. The device interrupt manager may be configured to transmit an operation targeted to a memory location in a system memory to record the interrupt for a virtual processor within the guest, wherein the interrupt is to be delivered to the targeted virtual processor. In an embodiment, a virtual machine manager may be configured to detect that an interrupt has been recorded by the device interrupt manager for a virtual processor that is not currently executing. The virtual machine manager may be configured to schedule the virtual processor for execution on a hardware processor, or may prioritize the virtual processor for scheduling, in response to the interrupt.

20 Claims, 11 Drawing Sheets

(56) References Cited

U.S. PATENT DOCUMENTS

| | | | |
|---|---|---|---|
| 7,000,051 | B2 | 2/2006 | Armstrong et al. |
| 7,054,975 | B2 | 5/2006 | Tjia |
| 7,130,949 | B2 | 10/2006 | Belmar et al. |
| 7,209,994 | B1 | 4/2007 | Klaiber et al. |
| 7,222,203 | B2 | 5/2007 | Madukkarumukumana et al. |
| 7,281,075 | B2 | 10/2007 | Armstrong et al. |
| 7,380,041 | B2 | 5/2008 | Belmar et al. |
| 7,546,406 | B2 | 6/2009 | Armstrong et al. |
| 7,552,236 | B2 * | 6/2009 | Greenfield et al. ........... 709/238 |
| 7,689,747 | B2 | 3/2010 | Vega et al. |
| 7,707,341 | B1 | 4/2010 | Klaiber et al. |
| 7,873,770 | B2 | 1/2011 | Hummel et al. |
| 7,945,905 | B2 | 5/2011 | Kumar et al. |
| 7,945,908 | B1 | 5/2011 | Waldspurger et al. |
| 8,055,827 | B2 | 11/2011 | Serebrin et al. |
| 8,180,944 | B2 | 5/2012 | Serebrin et al. |
| 8,234,429 | B2 | 7/2012 | Serebrin |
| 8,234,432 | B2 | 7/2012 | Serebrin |
| 8,489,789 | B2 * | 7/2013 | Serebrin et al. ............... 710/267 |
| 2004/0117532 | A1 | 6/2004 | Bennett et al. |
| 2004/0205272 | A1 | 10/2004 | Armstrong et al. |
| 2004/0215860 | A1 * | 10/2004 | Armstrong et al. ........... 710/260 |
| 2004/0230712 | A1 * | 11/2004 | Belmar et al. .................. 710/15 |
| 2005/0125580 | A1 | 6/2005 | Madukkarumukumana et al. |
| 2005/0132365 | A1 | 6/2005 | Madukkarumukumana et al. |
| 2005/0228921 | A1 | 10/2005 | Sethi et al. |
| 2006/0075146 | A1 | 4/2006 | Schoinas et al. |
| 2007/0157197 | A1 | 7/2007 | Neiger et al. |
| 2008/0015712 | A1 | 1/2008 | Armstrong et al. |
| 2008/0114916 | A1 | 5/2008 | Hummel et al. |
| 2008/0162762 | A1 | 7/2008 | Neiger et al. |
| 2009/0144733 | A1 | 6/2009 | Oiwa et al. |
| 2009/0307436 | A1 | 12/2009 | Larson et al. |
| 2010/0023666 | A1 * | 1/2010 | Mansell et al. ............... 710/267 |
| 2010/0191887 | A1 | 7/2010 | Serebrin |
| 2010/0223611 | A1 * | 9/2010 | Mahalingam et al. ............ 718/1 |
| 2011/0107328 | A1 | 5/2011 | Serebrin et al. |
| 2011/0161541 | A1 * | 6/2011 | Madukkarumukumana et al. ............................ 710/260 |

OTHER PUBLICATIONS

Adams, et al., A Comparison of Software and Hardware Techniques for x86 Virtualization, ACM, Oct. 2006, pp. 1-12.

Advanced Micro Devices, "AMD64 Virtualization Codenamed "Pacifica" Technology," Reference Manual, May 2005, Publication No. 33047, Revision 3.01, pp. 1-124.

Office Action from U.S. Appl. No. 12/611,595, mailed Dec. 17, 2010, pp. 1-11.

Office Action from U.S. Appl. No. 12/611,622, mailed Dec. 16, 2011, Benjamin C. Serebrin, pp. 1-9.

Office Action from U.S. Appl. No. 12/611,595, mailed May 27, 2011, Benjamin C. Serebrin, pp. 1-7.

Office Action from U.S. Appl. No. 12/611,607, mailed Sep. 27, 2011, Benjamin C. Serebrin, pp. 1-10.

Office Action from U.S. Appl. No. 12/961,189, mailed Feb. 5, 2013, Benjamin C Serebrin, pp. 1-9.

Dong, et al., "Towards High-Quality I/0 Virtualization," SYSTOR, May 2009, pp. 1-8.

International Search Report and Written Opinion from PCT/US2011/023942, dated Jul. 29, 2011, AMD, pp. 1-10.

International Search Report and Written Opinion from PCT/US2011/023943, dated Jul. 29, 2011, AMD, pp. 1-11.

International Search Report from PCT/US2010/022111 mailed Jun. 9, 2010, pp. 1-13.

Office Action from U.S. Appl. No. 12/961,189, mailed Dec. 3, 2012, Benjamin C. Serebrin, pp. 1-9.

U.S. Appl. No. 12/611,595, filed Nov. 3, 2009.
U.S. Appl. No. 12/611,607, filed on Nov. 3, 2009.
U.S. Appl. No. 12/611,622, filed on Nov. 3, 2009.
U.S. Appl. No. 12/613,076, filed on Nov. 5, 2009.
U.S. Appl. No. 12/961,189, filed Dec. 6, 2010.
U.S. Appl. No. 12/961,186, filed Dec. 6, 2010, Benjamin C. Serebrin.
Jun Nakajima, Intel Corporation, Reviewing Unused and New Features for Interrupt/APIC Virtualization, 2012, pp. 1-10.

* cited by examiner

INTERRUPT VIRTUALIZATION

This application is a continuation of U.S. patent application Ser. No. 12/961,186, filed on Dec. 6, 2010 and now U.S. Pat. No. 8,489,789, which claims benefit of priority to U.S. Provisional Patent Application Ser. No. 61/301,937, filed on Feb. 5, 2010. The above applications are incorporated herein by reference in their entireties. To the extent that anything in the provisional application contradicts material herein, the material herein controls.

BACKGROUND

1. Field of the Invention

This invention is related to processors and virtualization, and more particularly to delivering interrupts to virtual machine guests.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to execute two or more privileged programs on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

One issue that can arise with virtualization is the latency of interrupt delivery. As mentioned above, peripheral devices can be allocated for use by a virtual machine (to act as the virtual peripheral device in the virtual machine). Such peripheral devices can generate interrupts that are to be processed by the software in the virtual machine. In non-virtualized environments, the interrupt processing latency can be relatively short. In virtualized environments, the interrupts are generally intercepted by the VMM, processed by the VMM, and delivered to the targeted virtual machine by the VMM using a software mechanism of some sort. However, the interrupt processing latency can be significantly greater (about 100 times longer, for example) than environments which are not virtualized. In addition to peripheral device-generated interrupts (more briefly, "device interrupts" herein), processors can generate interprocessor interrupts (IPIs). In a virtual machine, an IPI can be generated between a virtual processor (or vCPU) and another vCPU in the virtual machine. The vCPUs are the processors defined to be included in the virtual machine of a given guest. There is at least one vCPU in a guest, but there may be multiple vCPUs for a multiprocessing guest.

SUMMARY

In an embodiment, a device interrupt manager may be configured to receive an interrupt from a device that is assigned to a guest (or from a device that supports a virtual function that is assigned to the guest). The device interrupt manager may be configured to transmit an operation targeted to a memory location in a system memory to record the interrupt for a virtual processor within the guest, wherein the interrupt is to be delivered to the targeted virtual processor. In one implementation, the device interrupt manager may be included in an input/output (I/O) memory management unit (IOMMU).

In an embodiment, a virtual machine manager may be configured to detect that an interrupt has been recorded by the device interrupt manager for a virtual processor that is not currently executing. The virtual machine manager may be configured to schedule the virtual processor for execution on a hardware processor, or may prioritize the virtual processor for scheduling, in response to the interrupt.

BRIEF DESCRIPTION OF THE DRAWINGS

The following detailed description makes reference to the accompanying drawings, which are now briefly described.

Figure 1:
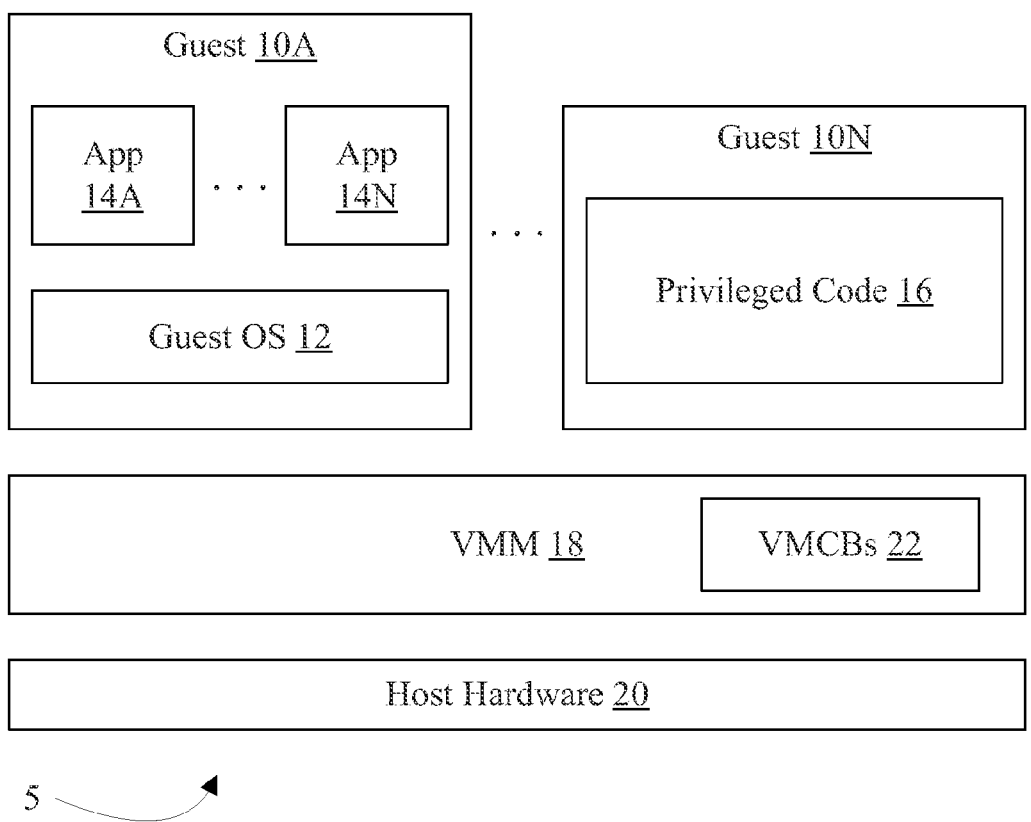
FIG. 1 is a block diagram of one embodiment of a computer system that implements virtualization.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." In some cases, the circuitry configured to perform the task or tasks may include a memory storing program instructions executable to implement the operation. The memory can include volatile memory such as static or dynamic random access memory and/or nonvolatile memory such as optical or magnetic disk storage, flash memory, programmable read-only memories, etc. Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

In an embodiment, a computer system includes a VMM and one or more guests executing in virtual machines. A peripheral device may be assigned to a guest (e.g. to operate as a corresponding virtual peripheral device in the guest's virtual machine). Alternatively, the peripheral device may support virtual functions, and a virtual function may be assigned to a guest. The peripheral device may generate device interrupts to be delivered to the guest. A device interrupt manager may be configured to detect that the device interrupt is targeted at a guest (as a opposed to a host interrupt targeted at the VMM or host software on which the VMM executes, if any). More particularly, the device interrupt manager may be configured to detect which vCPU within the guest's virtual machine is targeted by the interrupt. The device interrupt manager may be configured to record the interrupt in a guest interrupt controller data structure. If the targeted vCPU is currently executing on a hardware processor in the computer system, the hardware processor may detect the guest interrupt and may redirect the guest/vCPU to service the interrupt.

For example, the device interrupt manager may transmit a message to the hardware processor to indicate that a new guest interrupt has been recorded in the data structure. Responsive to the message, the hardware processor may read the guest interrupt data structure and prioritize the interrupt with other pending interrupts (if any) recorded in the data structure. Based on the prioritization, the hardware processor may either deliver the interrupt or wait to complete one or more higher priority interrupts and/or higher priority processes. In another example, the hardware processor may be configured to monitor the guest interrupt data structure (or a region within the guest interrupt data structure) during execution of the corresponding guest vCPU to detect that an interrupt has been recorded in the data structure. Responsive to detecting an update to the data structure, the hardware processor may read the data structure and deliver the interrupt as discussed above.

In one embodiment, the hardware processor may include a guest interrupt control unit that is configured to implement the processor portion of the above described operation for guest interrupts. Additionally, the guest interrupt control unit may ensure that guest accesses to a vCPU's interrupt controller are handled through the guest interrupt data structure rather than through a host interrupt controller that may be coupled to the hardware processor. That is, interrupt controller accesses in the guest may be converted into memory accesses within the guest interrupt data structure. Thus, the guest interrupt control unit may participate in virtualizing and emulating the guest interrupt control unit. In one implementation, the guest interrupt control unit may be implemented at least partially in microcode. Microcode may be instructions that are stored in a non-volatile memory within the processor, that are invoked by the processor circuitry in response to detecting certain instructions or other operations that are implemented via microcode routines. The microcode may thus be dispatched for execution in the processor to perform the implemented operation. In some embodiments, the guest interrupt control unit may be primarily implemented in microcode. In other embodiments, the guest interrupt control unit may be implemented in hardware.

The guest accesses to the vCPU interrupt controller may include reading/writing registers in the interrupt controller. In one embodiment, writing one or more registers in the interrupt controller may trigger an IPI. The guest interrupt control unit in the processor may initiate an IPI to the targeted vCPU in response to a write in a guest that causes an IPI. The guest IPI may include updating the data structure associated with the targeted vCPU to record the IPI. In general, an IPI may be an interrupt sourced by a processor, or more particularly by software executing on the processor. The IPI may target one or more processors in the system, sometimes including the sourcing processor. Accordingly, the IPI may be a mechanism for software executing on one processor to interrupt the software executing on another processor. IPIs may be used to pass messages between threads executing on different processors, to communicate an interrupt originally targeted at one processor to another processor, etc.

A processor or vCPU may be targeted by an interrupt if the interrupt is to be received by the interrupt controller associated with the processor/vCPU. The processor/vCPU may not necessarily process the interrupt, but may be a candidate for processing the interrupt and may participate in determining which processor(s)/vCPU(s) will process the interrupt. An interrupt may explicitly specify its target(s) (e.g. with a physical or logical ID), or may be a broadcast interrupt that targets all processors/vCPUs. Generally, an interrupt may be referred to as accepted if the interrupt controller associated with a targeted processor has recorded the interrupt for delivery to the processor. That is, at some point in time after acceptance, the interrupt will be delivered to the processor. Interrupting the processor to service the interrupt may be referred to as delivering the interrupt. The vCPU and/or corresponding virtual interrupt controller and/or the pair may be referred to herein more succinctly as the destination of an interrupt within the guest. The destination may ultimately be the vCPU that is to service the interrupt, but the corresponding virtual interrupt controller may also be viewed as the destination since it is associated with the corresponding processor and records the interrupt.

The computer system may include at least one host interrupt controller. The host interrupt controller may manage interrupts that are to be serviced by the host (e.g. the virtual machine manager, or VMM, in a virtualized environment and/or other software on which the VMM may run in some embodiments, such as a host OS). Such interrupts may include, for example, interrupts from devices in the computer system that are not assigned to a guest executing on the system, system level interrupts that the VMM does not wish to expose to a guest, etc. The guest interrupt operation described above may be used to manage interrupts that are to be serviced by a guest ("guest interrupts"). Guest interrupts may include, for example, interrupts issued by a device that is assigned to the guest to provide the functionality of the device for the guest's virtual machine or IPIs that are issued from one vCPU to another within the guest.

In an embodiment, the guest interrupt operation described herein may lead to reduced latency for guest interrupts. For example, in some embodiments, the latency to deliver a guest device interrupt may be similar to the latency to deliver a host device interrupt. The guest interrupt latency may be approximately the same as the host interrupt latency, latency of the same order of magnitude, etc.

In an embodiment, a substantial portion of the guest interrupt management may be implemented in the hardware processor. By locating much of the operation in one part of the system, the implementation may be simplified, in some embodiments. Accordingly, the implementation may be more likely to be correct, may be completed more rapidly, etc. in some embodiments.

Virtualization Overview

FIG. 1 illustrates a block diagram of one embodiment of a computer system 5 that implements virtualization. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. In one embodiment, there may be one VMCB 22 for each vCPU in each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, personal computer (PC)-style systems may include a Northbridge coupling the processors, the memory, and a graphics device that uses an interface such as a PCI Express Interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. Each node may also include a Northbridge. The host bridge may be used to couple, via HT links, to peripheral devices in a daisy chain fashion. Alternatively, many of the components may be included on a single device such as, for example, a single device that integrates one or more processors, Northbridge functionality and a graphics device. Any desired circuitry/host hardware structure may be used.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20 (and more particularly, vCPUs within the guests if the more than one vCPU is included). The VMM 18 may be configured to use the hardware support provided in the host hardware 20 for virtualization. For example, the processors may provide hardware support for virtualization, including hardware to intercept events and exit the guest to the VMM 18 for handling. The device interrupt manager and/or guest interrupt control units in processors may be hardware provided to support virtualization as well.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the host, in one embodiment. Generally, the host may include any code that is in direct control of the host hardware 20 during use. For example, the host may be the VMM 18, the VMM 18 in conjunction with the host OS, or the host OS alone (e.g. in a non-virtualized environment).

In various embodiments, the VMM 18 may support full virtualization, paravirtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20.

With paravirtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain. Alternatively, peripheral devices may support virtual functions which may be owned by a guest or with which a guest may interact.

As mentioned previously, the VMM 18 may maintain a VMCB 22 for each guest 10A-10N and/or each vCPU in the guest. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the operations performed by the processor to exit guest execution (generally in a restartable fashion) and to begin executing other code. In one embodiment, one exit mechanism may include saving a small amount of processor state and loading state for a Minivisor. The Minivisor may execute in the guest physical address space, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Host Hardware and Interrupt Virtualization

Figure 2:
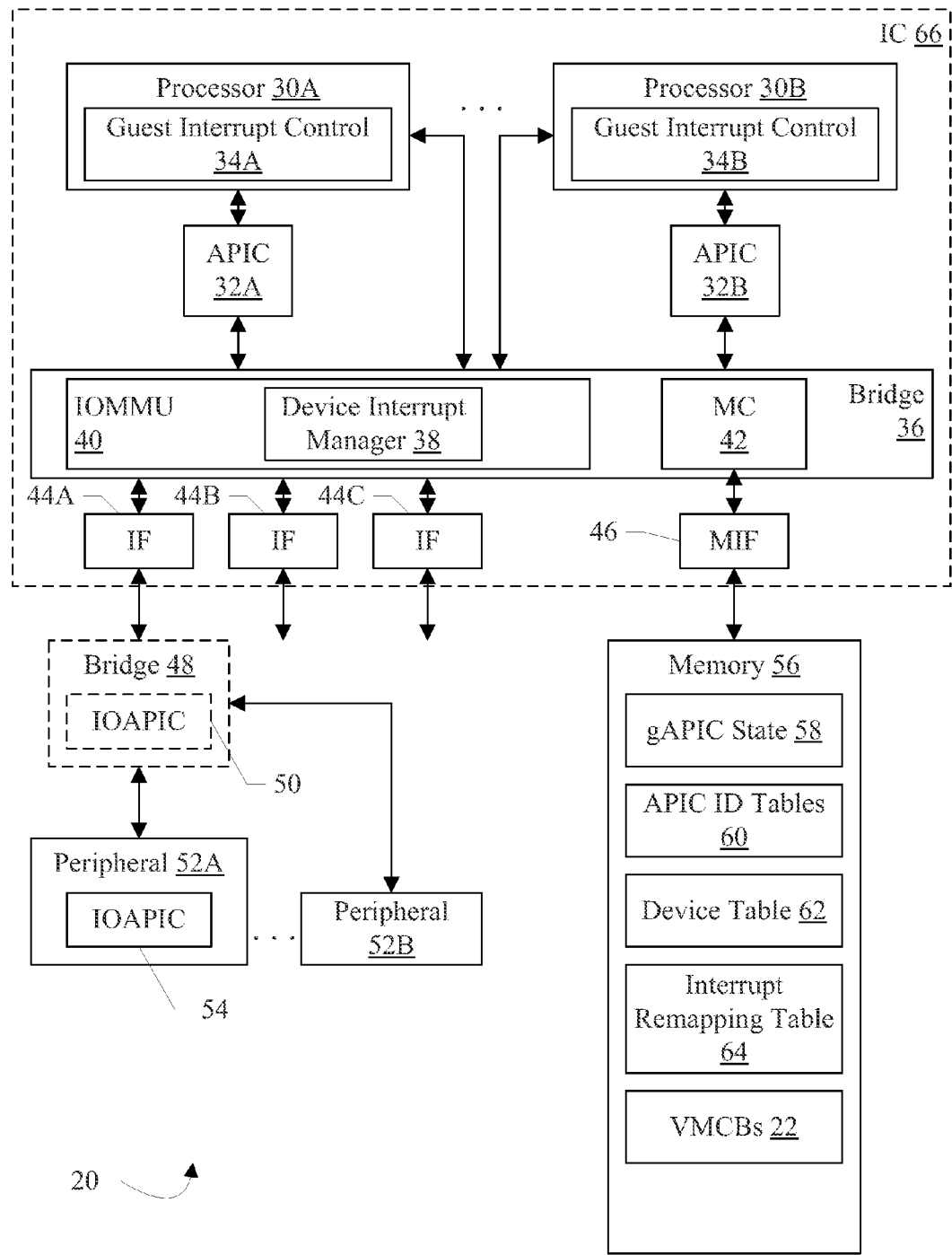
FIG. 2 is a block diagram of one embodiment of host hardware illustrated in FIG. 1.

Turning now to FIG. 2, a block diagram illustrating one embodiment of the host hardware 20 is shown. In the illustrated embodiment, the host hardware 20 includes a plurality of processors 30A-30B, respective Advanced Programmable Interrupt Controllers (APICs) 32A-32B, a bridge 36 (that includes a memory controller 42 and an input/output (I/O) memory management unit (IOMMU) 40 that further includes a device interrupt manager 38), a plurality of interface circuits (IF) 44A-44C, a memory interface circuit (MIF) 46, an optional bridge 48 that may include an I/O APIC (hereinafter IOAPIC) 50, peripherals 52A-52B (some of which may include an IOAPIC such as the IOAPIC 54), and a memory 56. The processors 30A-30B are coupled to the bridge 36 and to the respective APICs 32A-32B as illustrated in FIG. 2. The APICs 32A-32B are coupled to the bridge 36, which is coupled to the interface circuits 44A-44C and the memory interface circuit 46. The memory interface circuit 46 is coupled to the memory 56, and the interface circuit 44A is coupled to the bridge 48, which is coupled to the peripherals 52A-52B.

In the illustrated embodiment, each processor 30A-30B has an associated APIC 32A-32B. In this embodiment, interrupts may be communicated in the host hardware 20 according to the APIC specification described by Intel Corporation (Santa Clara, Calif.). See, e.g., Intel 64 and IA-32 Architectures Software Developer's Manual, Volume 3A: System Programming Guide, Part 1, Chapter 10 (December 2009), incorporated herein by reference in its entirety. In that specification, each processor has an associated local APIC that receives interrupts (from the processor itself, from other processors, from internal APIC interrupt sources, and from IOAPICs associated with peripherals). The local APIC prioritizes the pending interrupts, and transmits an interrupt to the processor if it is higher priority than another interrupt that is in progress on the processor and/or if it is higher priority than the processor's current task. The APIC specification will be used as an example herein, but any interrupt management specification may be used in other embodiments.

In the embodiment of FIG. 2, the APIC 32A-32B may be the local APIC for the processor's host interrupts (that is, interrupts to be processed by the host). On the other hand, the local interrupt controller for the guest interrupts may not be instantiated as a hardware APIC. Instead, the guest APIC (or more briefly, gAPIC) may be emulated via hardware support and the VMM 18. Specifically, each gAPIC may have its state stored in the gAPIC state data structure 58. The gAPIC data structure 58 may include a gAPIC state entry for each vCPU in each guest that is active in the computer system 5. In one embodiment, the gAPIC state entry may be a page of data for the corresponding gAPIC state. In such an embodiment, the gAPIC state data structure 58 may simply be a collection of pages. The pages need not be located near each other in the memory system, or have any other relationship to each other besides storing gAPIC state data for various gAPICs. Other embodiments may use larger or smaller gAPIC state entries and/or other data structures. A guest may be active on a processor if the guest is currently executing on that processor (e.g. a VMRUN instruction has been executed on the processor for the guest, and a guest exit has not occurred), or if the guest has exited and the VMM 18 is executing, but the guest is expected to be executed again on the processor.

When the VMM 18 schedules a guest/vCPU on a processor 30A-30B, the VMM 18 may load a pointer into the processor 30A-30B (and more particularly, into the guest interrupt control unit 34A-34B in the processor) from the VMCB 22 of the vCPU. The pointer may locate the corresponding gAPIC state entry in the gAPIC state data structure 58. Accordingly, the guest interrupt control unit 34A-34B may locate the gAPIC state for the vCPU, and may detect interrupts being recorded by the device interrupt manager 38. In one embodiment, the processors 30A-30B may implement a guest interrupt delivery mechanism. For example, the processors 30A-30B may include one or more registers that may be programmed with a guest interrupt (e.g. interrupt request, interrupt vector, etc.). The virtual interrupt may be logically combined with real interrupt sources (e.g. input pins to the processors 30A-30B) to interrupt the software executing on the processor 30A-30B. The processor 30A-30B may execute an interrupt handler specified by the interrupt vector to service the interrupt. Other embodiments may implement other guest interrupt delivery mechanisms.

In one embodiment, the device interrupt manager 38 may be configured to update guest interrupt state for device interrupts that target a guest, and to deliver host interrupts to the corresponding APIC 32A-32B. Particularly, in one embodiment, the device interrupt manager 38 may be configured to record each guest interrupt received in the bridge 36 in the gAPIC state data structure 58. In response to receiving a guest interrupt, the device interrupt manager 38 may be configured to update the gAPIC state in the gAPIC state data structure 58 for the guest/vCPU targeted by the interrupt. The device interrupt manager 38 may be configured to update the gAPIC state independent of whether or not the guest is active, in one embodiment. For multicast and broadcast interrupts that have more than one target, the device interrupt manager 38 may be configured to update the gAPIC state in the gAPIC state data structure 58 for each interrupt destination. Alternatively, the device interrupt manager 38 may be configured to rely on the VMM 18 for these multiple destination interrupts. The device interrupt manager 38 may be configured to log the interrupt in a memory location accessible to the VMM 18 in such embodiments, and may be configured to signal the VMM 18 to process the message.

The device interrupt manager 38 may determine the targeted processor or vCPU for a device interrupt from a peripheral device using the device table 62, the interrupt remapping table 64, and the APIC ID tables 60 shown stored in the memory in FIG. 2. Specifically, the device interrupt manager 38 may be configured to access the device table 62 and the interrupt remapping table 64 responsive to information included in the device interrupt request from the IOAPICs 50 and 54. The device table 62 may include entries for each peripheral 52A-52B (and may include multiple entries for a peripheral that includes more than one identifier on the peripheral interface to which the peripherals are coupled). The device table entry for a given peripheral may include a pointer to the interrupt remapping table 64 and may also include at least one APIC ID table pointer to one of the APIC ID tables 60. The APIC ID tables 60 may include an entry for each APIC ID in a guest, and may store a pointer to the gAPIC state entry corresponding to the vCPU/gAPIC having that APIC ID. The interrupt remapping table 64 may be used to redirect an interrupt from its original destination and/or interrupt vector to a new destination and/or interrupt vector. Accordingly, the interrupt remapping table 64 may include the destination ID for the interrupt. The destination ID is an APIC ID, and may be used as an index into the APIC ID table 60 indicated by the APIC ID table pointer from the device table 62 to locate the gAPIC state entry to be updated for the guest interrupt. Based on the interrupt vector from the interrupt remapping table 64, the device interrupt manager may record the interrupt in the identified gAPIC state entry. The interrupt remapping table 64 may also include an indication of whether the device is assigned to a guest or the host. If the device is assigned to the host, the interrupt is a host interrupt to be delivered to the APIC 32A-32B and the gAPIC state data structure 58 may not be updated. Additional details of one embodiment of the tables 60, 62, and 64 are discussed further below.

While the gAPIC state data structure 58 is shown as stored in memory 56 in the illustrated embodiment, portions may be cached by the device interrupt manager 38 and/or a cache accessible to the bridge 36 in some embodiments. In addition or alternatively, a dedicated memory for one or more gAPIC state entries may be implemented in the bridge 36.

In the APIC interrupt mechanism, each processor (through its local APIC) may have a physical APIC ID and a logical APIC ID. The physical APIC ID is stored in the APIC ID register. A physical APIC ID is matched on a one-to-one basis with the physical APIC ID indicated by a physical delivery mode interrupt. The logical APIC ID is stored in the logical destination register in the local APIC. The logical APIC ID has a cluster ID and a local APIC ID, where the local APIC ID is typically a one-hot bit vector. Logical delivery mode interrupts may include any set bits in the vector portion of the APIC ID to deliver interrupts to one or more local APICs in the cluster. Accordingly, matching a logical APIC ID may include comparing the cluster ID and detecting a set bit in the local APIC ID vector at the same position as the set bit of the one-hot bit vector in the local APIC. Viewed in another way, the local APIC ID vector in a logical delivery mode interrupt may be logically ANDed with the local APIC ID vector of the local APIC, and if the result is non-zero and the cluster ID matches, then the local APIC is a target of the logical interrupt. The logical APIC ID may be more succinctly referred to herein as the logical ID, and similarly the physical APIC ID may be more succinctly referred to herein as the physical ID. A given ID (logical or physical) associated with an interrupt may be referred to as the destination ID of the interrupt. A corresponding delivery mode for the interrupt may identify the destination ID of the interrupt as either logical or physical.

The APIC ID tables 60 may include a logical APIC ID table for logical APIC IDs in a given guest and a physical APIC ID table for physical APIC IDs in the given guest. The APIC ID tables may map the APIC IDs to gAPIC state pointers, as mentioned previously. In one embodiment, the logical APIC ID table may map logical IDs to physical IDs, which may be mapped through the physical ID table to a gAPIC state pointer. Other embodiments may map directly from logical IDs to gAPIC state pointers as well.

In an embodiment, the APIC ID tables 60 may include an indication of whether or not the vCPU is currently running. If the vCPU is running, the interrupt may be detected by the processor 30A-30B that is executing the vCPU (e.g. either through monitoring the gAPIC state entry for updates recording new interrupts, or via a message from the device interrupt manager 38). Accordingly, the interrupt may be delivered to the running guest. However, if the guest is not running (or is not active), the interrupt may be delayed in being delivered. In one embodiment, the IOMMU may log the interrupt. The VMM 18 may detect the interrupt in the log, and may prioritize the targeted vCPU for scheduling. A vCPU may be running if it is currently in execution on a hardware processor.

The APIC 32A-32B for a given processor 30A-30B may have any interface to the processor. For example, any interface used between local APICs and their respective processors may be used. Each APIC may be configured to independently signal the processor that an interrupt is being delivered for service. If the processor is executing a guest and the APIC signals an interrupt, the processor may be configured to exit the guest to the VMM 18 to process the host interrupt. If the processor is not executing the guest, the processor may be configured to interrupt the host execution and branch to the host interrupt handler in response to an interrupt signalled by the APIC.

The APICs 32A-32B are coupled to the bridge 36 to receive interrupts. Any interface may be used to transport interrupts to the APICs 32A-32B. For example, any interface implemented for APIC interrupt transport may be used. In one embodiment, the same communication mechanism used to communicate other operations to/from the processors 30A-30B (such as memory read/write operations initiated by the processors 30A-30B, probes for cache coherency maintenance, etc.) may be used to transport interrupt messages. Viewed in another way, the coupling of the APICs 32A-32B may be shared with the coupling of the processors 30A-30B to the bridge 36. Alternatively, the processors 30A-30B may have a separate path to the bridge 36, such as if the APICs 32A-32D use the APIC "3 wire interface." An interrupt message may be any communication on any interface that identifies the interrupt being transmitted and the destination of the interrupt. For example, interrupts may have associated interrupt vectors, and the interrupt vector may be part of the interrupt message. The interrupt message may also include the destination ID (e.g. logical or physical APIC ID).

The guest interrupt control unit 34A-34B may be configured to detect guest interrupts being recorded to the corresponding gAPIC state entry and may deliver the interrupts, as mentioned above. Additionally, the guest interrupt control unit 34A-34B may detect processor 30A-30B accesses to their own gAPICs during guest/vCPU execution, and may convert the accesses to memory reads/writes in the gAPIC state entry instead of accesses to the APICs 32A-32B. The guest interrupt control units 34A-34B may also implement some emulation of the gAPIC as well, in some embodiments. For example, operations that have significant performance impacts may be implemented. For emulation that is not implemented by the guest interrupt control units 34A-34B, the guest interrupt control units 34A-34B may exit the guest for emulation in the VMM 18. Some accesses may not require emulation (e.g. most reads have no effect other than to read the data, so no emulation beyond reading the data from the gAPIC state entry is needed). Writes that do not create any side effects in the APIC may also be completed by updating the corresponding location in the gAPIC state entry.

In one embodiment, the operations emulated in the guest interrupt control units 34A-34B may include the initiation of IPIs within the guest, access to the task priority register (TPR), and accesses to the end of interrupt (EOI) register. Other embodiments may implement different subsets of the operations in the guest interrupt control units 34A-34B. As previously noted, in some embodiments, the guest interrupt control units 34A-34B may be implemented primarily in microcode. Accordingly, during guest execution, accesses to the gAPIC may cause microcode execution. Additionally, an update to the gAPIC state entry by the device interrupt manager 38 (for the vCPU being executed on the processor) may cause microcode execution. For instructions that exit to the VMM 18, the exit may be performed after the instruction retires (i.e. the update is completed to the gAPIC state entry for a write, or the data read from the gAPIC state entry is written to the target register for a read) or before the instruction retires. Initiating the VMExit after retiring the instruction may be referred to as trapping. In some cases, the corresponding instruction may cause irreparable change if allowed to retire. Accordingly, such instructions may not be permitted to retire before the VMExit, referred to as faulting the instruction.

The IOMMU 40 includes the device interrupt manager 38, as described above. Additionally, the IOMMU 40 may be configured to perform virtual to physical address mapping for I/O-initiated memory operations (e.g. memory read/write operations sourced from the peripherals 52A-52B or by DMA controllers on behalf of the peripherals 52A-52B). As part of the translation operation, the IOMMU 40 may be configured to access the device table 62 and optionally the interrupt redirect table 64. The device table entries for each peripheral 52A-52B may include a page table pointer to I/O page tables for translating the memory addresses of the memory read/write operations (not shown).

The memory controller 42 may be coupled to receive memory operations issued by the processors 30A-30B (e.g. instruction fetches, load/store data accesses, processor page table accesses for translation, etc.), memory operations from the device interrupt manager 38 (e.g. to read/update the gAPIC state data structure 58 and/or to access the tables 60, 62, and 64), the IOMMU 40 (e.g. to access I/O page tables, the device table 62, and the interrupt remapping table 64), and memory operations received from the interface circuits 44A-44C (in some embodiments). The memory controller 42 may be configured to order the memory operations, and to communicate with the memory 56 to perform the memory operations. The memory interface circuit 46 may perform the physical level accesses to the memory 56.

The memory 56 may comprise any type of memory. For example, the memory 56 may comprise dynamic random access memory (DRAM) such as synchronous DRAM (SDRAM), double data rate (DDR, DDR2, DDR3, etc.) SDRAM including mobile versions (mDDR3, etc.) and/or low power versions (LPDDR2, etc.) of the DDR SDRAM, RAMBUS DRAM, static RAM, etc. The memory 56 may include one or more memory modules comprising multiple memory chips, such as single inline memory modules (SIMMs), dual inline memory modules (DIMMs), etc.

In addition to including the device interrupt manager 38, the IOMMU 40, and the memory controller 42 in this embodiment, the bridge 36 may also include other communication functionality to communicate between the processors 30A-30B, the APICs 32A-32B, and devices coupled to the interface circuits 44A-44D. For example, in the illustrated embodiment, another bridge 48 may be coupled to the interface circuit 44A, and may be configured to bridge communications between the protocol used by the interface circuit 44A and the protocol used by the peripherals 52A-52B. In one embodiment, the interface circuits 44A-44C may implement the HT interface mentioned above, for example, and the bridge 48 may bridge from HT to another interface such as the PCI Express (PCIe) interface. The peripherals 52A-52B may be PCIe devices in such an embodiment. The bridge 48 may also be configured to bridge to other interfaces, or another bridge may be coupled to the bridge 48 to bridge to other interfaces. Any peripheral interface or interfaces may be used. Additionally, the peripherals 52A-52B may comprise HT peripherals configured to couple directly to the HT interface. Such peripherals may not require the bridge 48.

In one embodiment, the bridge 48 and/or one or more of the peripherals 52A-52B may include IOAPICs (50 and 54 in FIG. 2). The IOAPICs may be responsible for receiving interrupt requests from the peripherals, and forming interrupt messages to transmit the interrupt requests to the APICs 32A-32B and the device interrupt manager 38 (for recording in the gAPIC state data structure 58 in memory).

As mentioned above, in one embodiment, the interface circuits 44A-44C may be configured to communicate on the HT interface. The interface circuits 44A-44C may be configured to communicate with peripheral devices/bridges using HT. Additionally, in some embodiments, the interface circuits 44A-44C may be configured to coupled to other nodes with processors, APICs, etc. In such embodiments, the bridge 36 may include coherence management circuitry in addition to the previously described circuitry.

The processors 30A-30B may implement any instruction set architecture, and may be configured to execute instructions defined in the instruction set architecture. The processors 30A-30B may include any microarchitecture, such as superpipelined, superscalar, and/or combinations thereof; in-order or out-of-order execution; speculative execution; etc. The processors 30A-30B may or may not implement microcoding techniques, as desired.

The peripherals 52A-52B may comprise any type of peripheral device. The peripherals 52A-52B may include storage devices such as magnetic, solid state, or optical disk drives, non-volatile memory devices such as Flash memory, etc. The peripherals 52A-52B may include I/O devices such as user I/O devices (keyboard, mouse, display, voice input, etc.), networking devices, external interface devices such as Universal Serial Bus (USB) or Firewire, etc.

In the illustrated embodiment, the processors 30A-30B, the bridge 36, the APICs 32A-32B, the interface circuits 44A-44C, and the memory interface circuit 46 may be integrated onto a single semiconductor substrate as an integrated circuit 66. Other embodiments may implement different amounts of integration and discrete circuitry, as desired. It is noted that, while various numbers of components such as processors, APICs, interface circuits, peripherals, bridges, etc. are illustrated in FIG. 2, other embodiments may implement any number of one or more of each component, as desired.

In other embodiments, the location of the IOMMU 40 and the device interrupt manager 38 may vary. For example, one or both may be in the bridge 48, in the peripherals 52A-52B, in another bridge coupled to the bridge, etc.

In the illustrated embodiment, each APIC 32A-32B is associated with a particular processor 30A-30B as illustrated in FIG. 2. Thus, a given interrupt controller is dedicated to the corresponding processor 30A-30B in this embodiment. More particularly, in FIG. 2: the APIC 32A is dedicated to the processor 30A; and the APIC 32B is dedicated to the processor 30B. An interrupt controller may signal an interrupt to its corresponding processor in any fashion. Generally, the signalling may indicate that an interrupt is needed. The signalling may include the interrupt vector, or the interrupt vector may be read by software executed after the interrupt is delivered. Delivering the interrupt may refer to signalling the processor and the processor accepting the interrupt, in an embodiment. Servicing an interrupt may refer to executing an interrupt service routine associated with the interrupt vector to perform the operations needed by the interrupting device.

Figure 3:
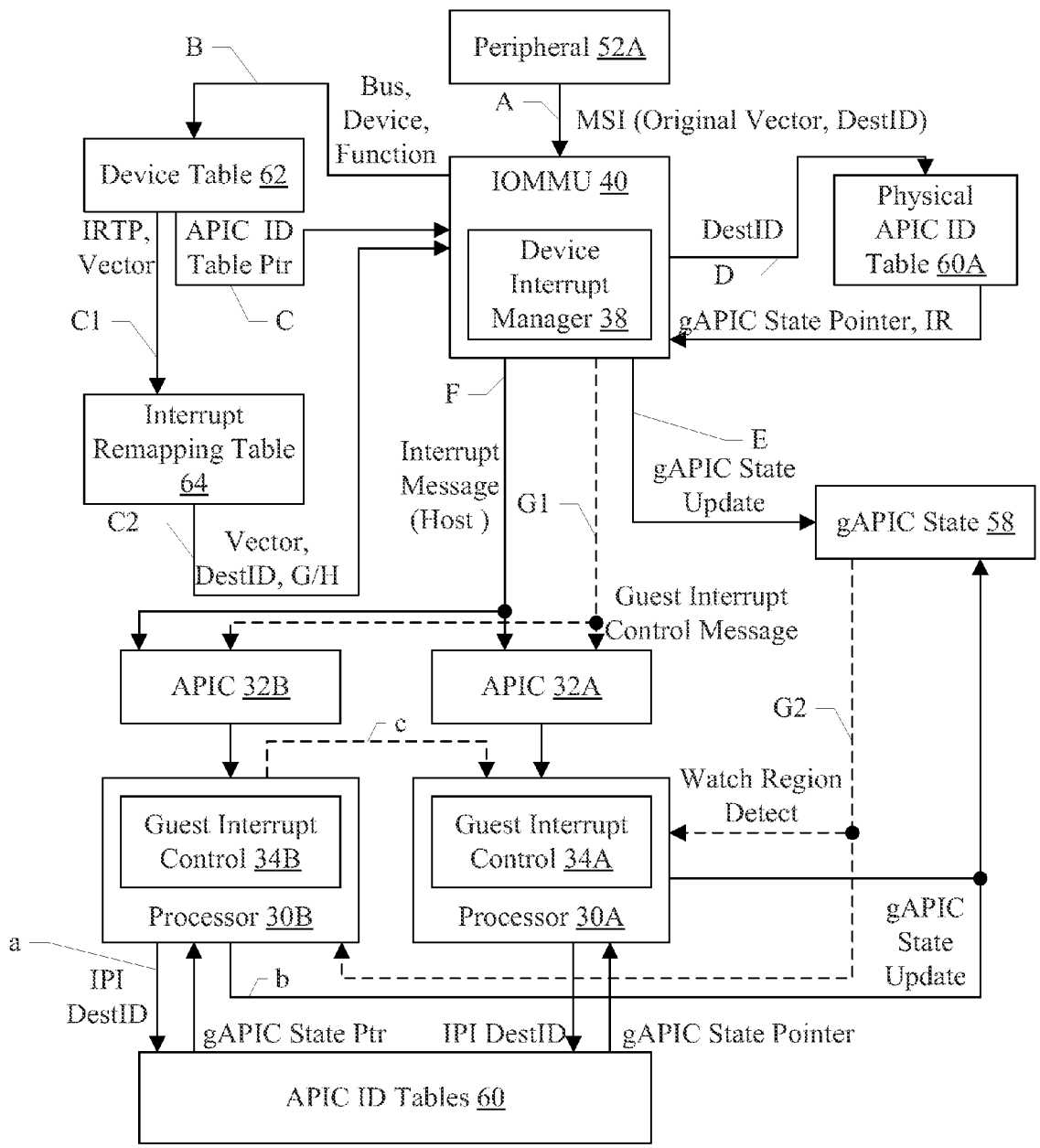
FIG. 3 is a block diagram illustrating one embodiment of an interrupt being delivered to a guest.

Turning now to FIG. 3, a block diagram is shown illustrating progression of an interrupt from a peripheral to a gAPIC, for one embodiment and also illustrating IPIs within a guest.

In the illustrated embodiment, the peripheral 52A determines that an interrupt is desired. The IOAPIC 54 within the peripheral 52A (see FIG. 2) may generate the interrupt message for the peripheral 52A. Specifically, the IOAPIC 54 may generate the interrupt vector that corresponds to the desired interrupt (e.g. based on the service needed by the peripheral 52A, the specific function signalling the interrupt if the peripheral 52A implements multiple functions, etc.). Similarly, the IOAPIC 50 may generate interrupt messages for peripherals such as peripheral 52B that do not implement their own IOAPICs. The interrupt vector is part of the interrupt communication, and may be used to identify interrupt sources, prioritize interrupts, etc. In some cases, the interrupt vector may be remapped by the IOMMU 40, so the interrupt vector is illustrated as the "original vector" in FIG. 3. The peripheral 52A may transmit the interrupt message to the IOMMU 40 (arrow A). In this embodiment, the interrupt may be transmitted in the form of a message-signalled interrupt (MSI), e.g. as defined in the PCIe specification. Other embodiments may transmit the interrupt in any desired fashion. Generally, the transmission may identify the interrupt, its delivery mode (e.g. logical or physical), and the destination ID (DestID) of the interrupt.

The IOMMU 40 may receive the MSI. The MSI includes an identifier of the peripheral. For example, interfaces that implement the PCI programming model may identify each device with a bus number and a device number on that bus (allowing for multiple PCI interfaces to exist in a system in hierarchical and/or parallel form). Devices may have multiple "functions", which may be separate virtual devices on the physical device, or a partitioning of operations on the device. The identifier may include the function number also. Thus, in this embodiment, the identifier may be referred to as the Bus-Device-Function, or BDF. The IOMMU 40 (and more particularly the device interrupt manager 38, in this embodiment), may index into the device table 62 using the BDF (arrow B), and may identify a device table entry corresponding to the peripheral 52A. The entry may include the APIC ID table pointer (arrow C). In this embodiment, the device table entry may also include an interrupt remapping table pointer (IRTP) that may identify an interrupt remapping table 64 corresponding to the device (arrow C1). The interrupt remapping table 64 may be indexed by the original interrupt vector, and may provide an output vector and destination ID (DestID, e.g. logical or physical APIC ID) for the interrupt (arrow C2). Additionally, a guest/host indication may be output (G/H). In one embodiment, the G/H indication may be a bit indicating, when set, that the interrupt is to be serviced by a guest and indicating, when clear, that the interrupt is to be serviced by the host. Other embodiments may use the opposite meanings of the set and clear states, or may use other encodings for the indication.

If the G/H indication indicates host, the device interrupt manager 38 may transmit an interrupt message to the APICs 32A-32B, and the interrupt may be handled according to the APIC specification (arrow F). On the other hand, if the G/H indication indicates guest, the device interrupt manager 38 may use the destination ID as an index (arrow D) into the physical APIC ID table 60A (which is the table pointed to by the APIC ID table pointer provided by the device table 62). The physical APIC ID table 60A may output the gAPIC state pointer identifying the gAPIC state entry to be updated. The device interrupt manager 38 may write the interrupt to the gAPIC state (gAPIC state update, arrow E in FIG. 3). The physical APIC ID table 60A may also supply an Is_Running (IR) indication for the vCPU. If the vCPU is running, the interrupt may be delivered fairly rapidly. If the vCPU is not running, the device interrupt manager 38 may log the interrupt for the VMM 18, which may schedule the vCPU to process the interrupt.

The illustrated embodiment accesses only the physical APIC ID table 60A with the destination ID. Accordingly, in the illustrated embodiment, destination IDs for guest interrupts may be physical APIC IDs. Logical APIC IDs may be translated to physical APIC IDs by the VMM 18 when programming the device table 62, the interrupt mapping table 64, etc. In other embodiments, both logical APIC IDs and physical APIC IDs may be supported and both the logical APIC ID table and the physical APIC ID table for a given guest may be used as needed for locating the gAPIC state pointer.

In one embodiment, the gAPIC state includes an interrupt request register (IRR) that includes a bit for each interrupt vector. To record the interrupt, the bit corresponding to the interrupt vector may be set in the IRR. It is possible that the IRR in the gAPIC state is being updated from more than one source. Accordingly, the update may be made atomic to prevent loss of state. Particularly, the update may be an atomic OR that ORs the set bit into the IRR in memory. An atomic operation may be an operation which is performed effectively as a unit, even if the operation is implemented as multiple steps. An observer attempting to access a location being atomically updated either receives the value prior to the atomic update, or after the atomic update, but may not receive an intermediate value. An observer attempting to update the location being atomically updated either performs its update before the atomic operation, or after the atomic operation completes, but not during the atomic operation. While this embodiment may implement an atomic OR, other embodiments may implement a more general atomic update operation. For example, the atomic update may include an AND mask identifying bits of the target that should be unmodified, and an OR mask identifying which bits to be ORed in. Other implementations are possible as well. For example, a compare and swap implementation may be used in which the original value from the memory location is read and a compare and swap operation is performed against the original value with the new value ORed in. If the compare fails, the process may be repeated (reading a new original value, and performing the compare and swap). Backoff and/or timeout mechanisms may be used to fall out of the loop, if needed.

In one embodiment, the processors 30A-30B (and more particularly the guest interrupt control units 34A-34B) may monitor for updates to the gAPIC state entry corresponding to the vCPU executing on the processor (if any). Specifically, the processors may each monitor a region of the gAPIC state entry that includes the IRR bits, wherein the gAPIC state entry corresponds to the vCPU that processor is executing. This region is referred to as the "watch region" herein. The watch region may be established in various fashions. For example, the processors 30A-30B may include caches, and may be configured to maintain coherency between the caches and memory. As part of the coherency mechanism, the processors 30A-30B may be informed of updates to data stored in the caches. The processors 30A-30B may thus establish the watch region by reading the region into the cache. For example, 2 cache blocks may cover the region, in one embodiment. In some embodiments, it may be necessary to ensure that the cache blocks remain in the cache. For example, some embodiments may filter coherency probes that are known to miss in the processor's caches. Ensuring that the watch region blocks remain in the cache may ensure that probes corresponding to watch region updates are not filtered in such embodiments.

A variety of mechanisms may be used to ensure that the watch region blocks remain in the processor's caches. For example, the processors may implement cache locking to lock the blocks in the cache. Alternatively, the processors may force the blocks to remain "most recently used" in the cache replacement algorithm implemented by the cache. On the other hand, it may not be necessary to ensure that the watch region blocks remain in the processor's caches, e.g. if coherency probes are not filtered. In such embodiments, the processors may simply store the addresses of the region in registers and compare the addresses to the probes.

If the gAPIC state update occurs to a gAPIC state entry for a vCPU that is running on the processors 30A-30B, the corresponding processor may detect the update to the watch region (arrow G2). The guest interrupt control unit 34A-34B in the corresponding processor may read the updated IRR, and may prioritize the pending interrupts and take the new interrupt if it is higher priority.

In another embodiment, the watch regions may not be used and the device interrupt manager 38 may instead transmit a guest interrupt control message to the APICs 32A-32B (or directly to the processors 30A-30B) (arrow G1). The guest interrupt control message may be distinguishable from host interrupt messages and IPIs, and thus may be forwarded to the guest interrupt control units 34A-34B to inform them that the guest interrupt has been requested. For example, the guest interrupt control message may use a previously undefined interrupt message coding, distinguishing it from host interrupt messages and IPIs, which use existing interrupt message codings. Other embodiments may implement both the watch regions and the guest interrupt control message.

In one embodiment, the guest interrupt control message may be delivered to the guest interrupt control units 34A-34B through a model specific register (MSR) interface. The MSR may be accessible to the guest interrupt control units 34A-34B (e.g. accessible to microcode, if guest interrupt control units 34A-34B are implemented partially or fully in microcode). The MSR may also be accessible to privileged code executing on the processors 30A-30B. However, the MSR may be protected from non-privileged access including guest access. The APICs 32A-32B may use a similar interface to that used for IPIs to deliver the interrupt to the MSR, except that the MSR is written instead of delivering the IPI to interrupt software. The update of the MSR may cause the guest interrupt control units 34A-34B to activate guest interrupt delivery. For example, in embodiments that implement the guest interrupt control units 34A-34B in microcode, the update of the MSR may cause execution of a microcode routine that processes the interrupt for delivery to the guest. While an MSR interface may used in one embodiment, other embodiments may use any mechanism that permits the guest interrupt control message to be delivered to the guest interrupt control units 34A-34B. Such mechanisms may be referred to as "doorbell" mechanisms.

In addition to device interrupts, guest vCPUs executing on the processors may issue IPIs to other vCPUs in the same virtual machine. In the present embodiment, an IPI is issued when the software executing on the vCPU updates the interrupt command register (ICR). The interrupt command register may include high and low (ICRH and ICRL) portions, and an IPI may be initiated in response to a write to the ICRL register. This mechanism may be compatible with both the x1 APIC encodings and the x2 APIC encodings. The guest interrupt control unit 34A-34B of the processor executing the source vCPU of the IPI may detect the write to the ICRL register, and may use the destination ID of the IPI to identify a gAPIC state pointer in the APIC ID tables 60 (arrow a). The destination ID of the IPI may be either logical or physical, and the guest interrupt control unit 34A-34B may use the logical and/or physical APIC ID tables 60 as appropriate for the destination ID. Using the gAPIC state pointer, the guest interrupt control unit 34A-34B may update the gAPIC state entry of the targeted vCPU in the gAPIC state data structure 58 (arrow b). The guest interrupt control unit 34A-34B may also be configured to communicate a guest interrupt control message to the guest interrupt control unit 34A-34B of the processor 30A-30B that is executing the targeted vCPU (arrow c). More particularly, the guest interrupt control message to deliver the IPI may be routed through the APICs 32A-32B, in an embodiment. Alternatively, embodiments which implement the watch region may use watch region detection to detect the updates. Other embodiments may implement other mechanisms to initiate an IPI. The guest interrupt control units 34A-34B may detect the mechanism, and may update the gAPIC state for the targeted vCPU accordingly. Additionally, if the APIC ID tables 60 indicate that the target vCPU is not running, the guest interrupt control unit from the source processor may cause a VMExit to permit the VMM 18 to schedule the targeted vCPU.

In one embodiment, to transmit the guest interrupt control message for an interrupt to the correct processor 30A-30B, the IR bit in the APIC ID tables 60 may be a field identifying which processor is executing the corresponding vCPU (or there may be a bit indicating whether or not the vCPU is running and a field identifying the processor). The field may be used to identify the target for the guest interrupt control message.

Figure 4:
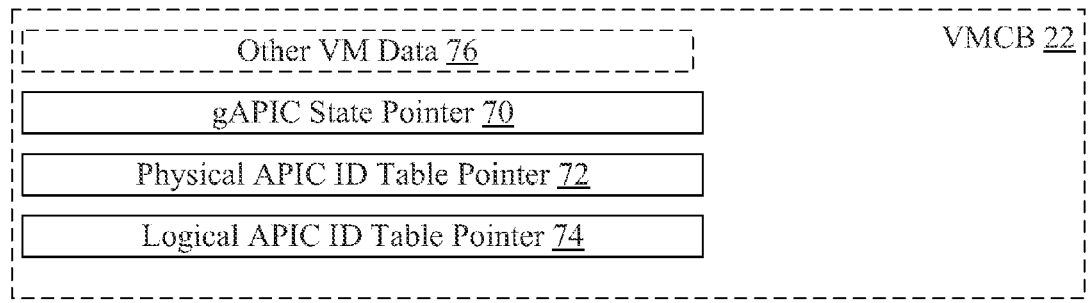
FIG. 4 is a block diagram illustrating one embodiment of a virtual machine control block (VMCB).

Turning now to FIG. 4, a block diagram of one embodiment of the VMCB 22 is shown. In the illustrated embodiment the VMCB 22 includes a gAPIC state pointer field 70, a physical APIC ID table pointer field 72, a logical APIC ID table pointer field 74, and other virtual machine data 76. The gAPIC state pointer 70 may locate the gAPIC state entry corresponding to the guest/vCPU in memory 56. The gAPIC state pointer 70 may be loaded into a processor 30A-30B as part of the VMRUN instruction, and may be used by the guest interrupt control unit 34A-34B to location the gAPIC state for the vCPU. The physical APIC ID pointer field 72 and the logical APIC ID table pointer field 74 may store the physical APIC ID table pointer and the logical APIC ID table pointer for the guest, respectively. The other VM data 76 may include various other processor state that is loaded/stored on VMRUN and VMExit.

Figure 5:
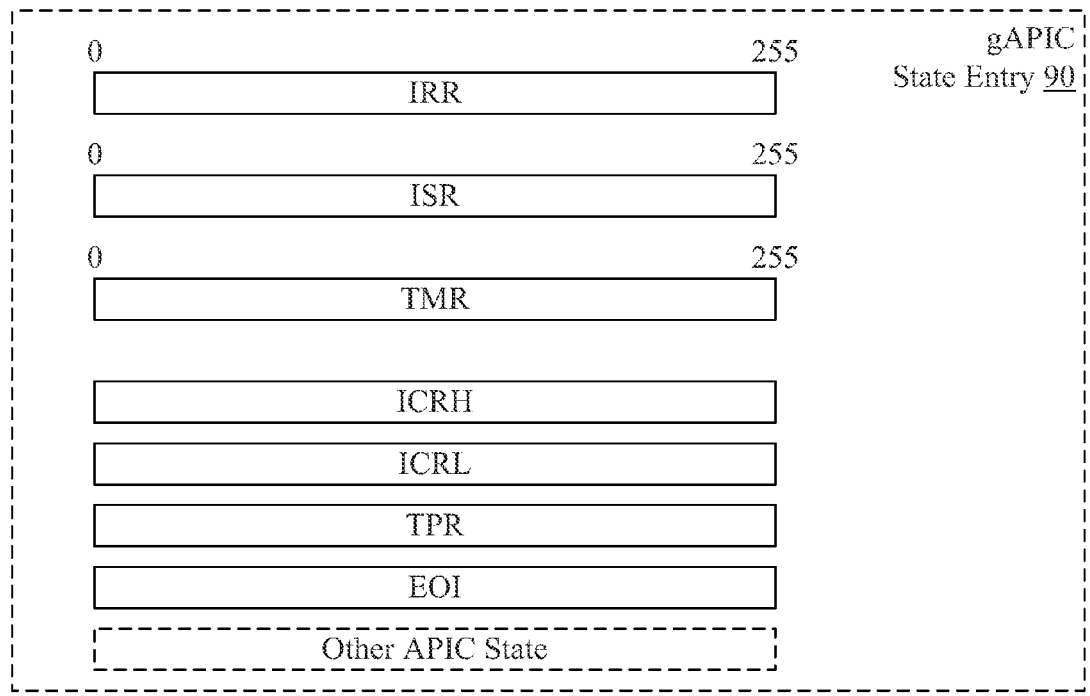
FIG. 5 is a block diagram illustrating one embodiment of a guest APIC state entry in guest APIC state data structure.

Turning now to FIG. 5, a block diagram of one embodiment of the gAPIC state entry 90 is shown. The illustration in FIG. 5 may be the logical view of the state. The actual arrangement of the state in memory may vary. In one embodiment, the arrangement of state may be in the order that the state is addressed in the APIC. That is, each register may have an offset from the base address of the APIC, and the corresponding copies of state in the gAPIC state entry 90 for each register may be at the same offset from the base address of the gAPIC state entry 90.

The gAPIC state entry 90 may include a complete copy of the APIC state. Not all state is illustrated in FIG. 5 However, the IRR, in-service register (ISR), the trigger mode register (TMR) and ICRH and ICRL registers, the task priority register (TPR) and the end of interrupt (EOI) registers are shown, along with other APIC state. The other APIC state may be interleaved within the illustrated state (e.g. according to the offsets for each register in the APIC address map). Furthermore, the order of the state as shown in FIG. 5 may not be order of the state as stored in memory.

The IRR register records the interrupt requests that have been transmitted to the gAPIC. The position of the interrupt request in the IRR corresponds to the interrupt vector. The IRR may track the "fixed" interrupts. Other interrupt types may include non-maskable interrupt (NMI), system management interrupt (SMI), legacy external interrupt (extINT), etc. These interrupts may be handled as part of the other APIC state. In one embodiment, the interrupt message may also include a trigger mode for each interrupt (level or edge). The TMR may store an indication of which trigger mode applies to the interrupt. For example, edge triggered interrupts may be represented by a binary 0 in the TMR and level triggered may be represented by a binary 1. In other embodiments, only edge triggered interrupts may be supported in the gAPIC, and the TMR may be eliminated.

For fixed interrupts, the guest interrupt control unit 34A may be configured to prioritize the interrupt requests and in-service interrupts to determine if an interrupt request should be delivered to the processor. Generally, if the highest priority interrupt request is higher priority than the highest priority in-service interrupt (where an interrupt is in-service if the processor has interrupted its software execution to execute the interrupt handler corresponding to the interrupt), the guest interrupt control unit 34A may be configured to deliver the requested interrupt. Additionally, the TPR may be programmed by software to establish the minimum priority level of interrupt that is being accepted by the vCPU. The guest interrupt control unit 34A may be configured to deliver the highest priority interrupt request if it is higher priority than the highest priority in-service interrupt and if it is higher priority than the priority indicated in the TPR.

When the vCPU takes the interrupt, the processor may respond with an interrupt acknowledge command to the gAPIC. The guest interrupt control unit 34A may be configured to remove the highest priority interrupt request from the IRR 70 and log the interrupt as in-service in the ISR. The position of the in-service indication corresponding to the interrupt in the ISR may correspond to the interrupt vector of the interrupt. The processor 30A may execute the interrupt service routine (or routines) to service the interrupt. The interrupt service routine may end with an end of interrupt (EOI) command to the gAPIC to signal that the interrupt service is completed. The guest interrupt control unit 34A may be configured to remove the highest priority in-service interrupt from the ISR in response to the EOI command. When performing an EOI command, microcode may clear ISR bit #N (where N is the highest priority in-service interrupt). If bit #N of the TMR is set, then microcode may VMExit to permit the VMM 18 to emulate level sensitive interrupt behavior. In other embodiments, updating the ISR may be managed by VMM 18.

As mentioned above, each of the IRR, the ISR, and the TMR include a location corresponding to each interrupt vector supported by the gAPIC. In the illustrated embodiment, vectors 0 through 255 are supported. The interrupt vector number may also be indicative of its relative priority with other interrupts (e.g. higher vector numbers are higher priority than lower vector numbers, or vice versa in other embodiments). For each interrupt vector, the IRR stores an interrupt request bit indicating whether or not an interrupt is requested at that interrupt vector. For example, the indication may be a bit indicative of a request when set and indicative of no request when clear. Similarly, for each interrupt vector, the ISR stores an in-service bit indicative of whether or not an interrupt is in service for that interrupt vector (e.g. indicative of an in-service interrupt when set and no in-service interrupt when clear). For each interrupt vector, the TMR stores the trigger mode. For each of the IRR, the ISR, and the TMR, the bit location in the register is equal to the interrupt vector number that corresponds to the interrupt. It is noted that, while 256 interrupt vectors are supported in the illustrated embodiment, more or fewer interrupt vectors and/or more or fewer priority level groups may be supported in other embodiments. The other APIC state may include internally-generated interrupts, timers, the local vector table, etc.

In one embodiment, the bits of the IRR, ISR, and/or TMR in the gAPIC state entry 90 may not be arranged as 8 bits per byte. To facilitate easy addressing to a particular IRR, ISR, or TMR bit, the bits may be stored in a more dispersed fashion (e.g. two bits per byte, one bit per byte, etc.).

Figure 6:
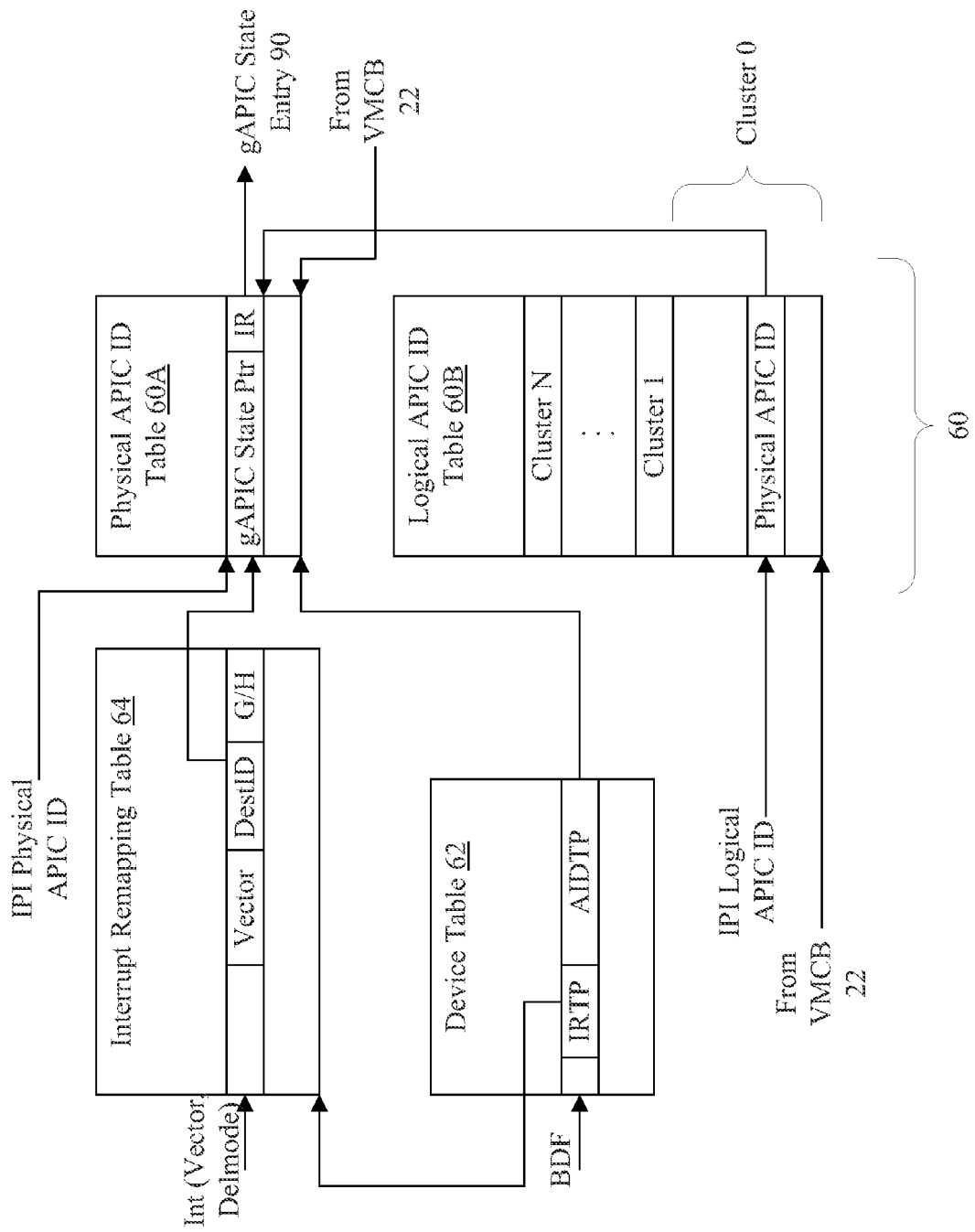
FIG. 6 is a block diagram illustrating one embodiment of locating a guest APIC state entry for an interrupt.

Turning next to FIG. 6, a block diagram of one embodiment of the device table 62, the interrupt remapping table 64, and the APIC ID tables 60A-60B and locating a gAPIC state entry 90 using the tables is shown.

For a device interrupt, the Bus/Device/Function (BDF) of peripheral device that sources the interrupt may be used as an index into the device table 62. The base address of the device table 62 may be stored in the IOMMU 40, and there may be one device table 62 per computer system 5 (or one device table 52 per IOMMU 40, if multiple IOMMUs are included in the system). The device table entry selected in response to the BDF includes the interrupt remapping table pointer (IRTP), which is the base address of the interrupt remapping table 64. There may be one interrupt remapping table 64 per guest in the system 5, in one embodiment. Additionally, the device table entry may include an APIC ID table pointer (AIDTP), which may be the base address of the physical APIC ID table 60A. In other embodiments, logical APIC IDs may be supported for device interrupts, and there may be two AIDTP fields in the device table 62 (one for the logical APIC ID table 60B, and the other for the physical APIC ID table 60A). There may be one logical APIC ID table 60B and one physical APIC ID table 60A per guest in the computer system 5, in one embodiment.

The index into the interrupt redirect table 64 is the interrupt identifier for the interrupt. The interrupt identifier may include the interrupt vector, and may also include the delivery mode (Delmode), either physical or logical. The selected entry may include a new vector and destination ID (DestID). Additionally, the selected entry may include the guest/host (G/H) field mentioned above.

The destination ID may be an index into the physical APIC ID table 60A, and the selected entry may include the gAPIC state pointer to the gAPIC state entry 90. Additionally, the selected entry may include the IR4 indication for the vCPU.

For IPIs, the targeted vCPU may be identified by logical APIC ID or physical APIC ID. For physical APIC IDs, the ID may be used as an index into the physical APIC ID table 60A (the address of which is loaded from the VMCB into the guest interrupt control unit 34A-34B). The gAPIC state pointer and IR field may thus be accessed for physical IPIs.

If the IPI has a logical APIC ID, the logical APIC ID may be used as an index into the logical APIC ID table 60B. The most significant portion of the logical APIC ID may identify the cluster. Accordingly, the table is sub-divided into clusters, each of which may include one or more entries for each logical member of the cluster. The number of members in the cluster may vary depending on the mode (e.g. x1 APIC flat mode may include up to eight members per cluster; the x1 APIC clustered mode may include up to four members per cluster; and the x2 APIC mode may include up to sixteen cluster members. The logical APIC ID table 60B may be sized to handle any mode, so each cluster subdivision in this embodiment may include 16 members.

As illustrated in FIG. 6, each entry in the logical APIC ID table 60B may map the corresponding cluster member to the physical APIC ID of that cluster member. The physical APIC ID output from the logical APIC ID table 60B may be used as an index into the physical APIC ID table 60A, which may supply the gAPIC state pointer and the IR field for the vCPU.

Figure 7:
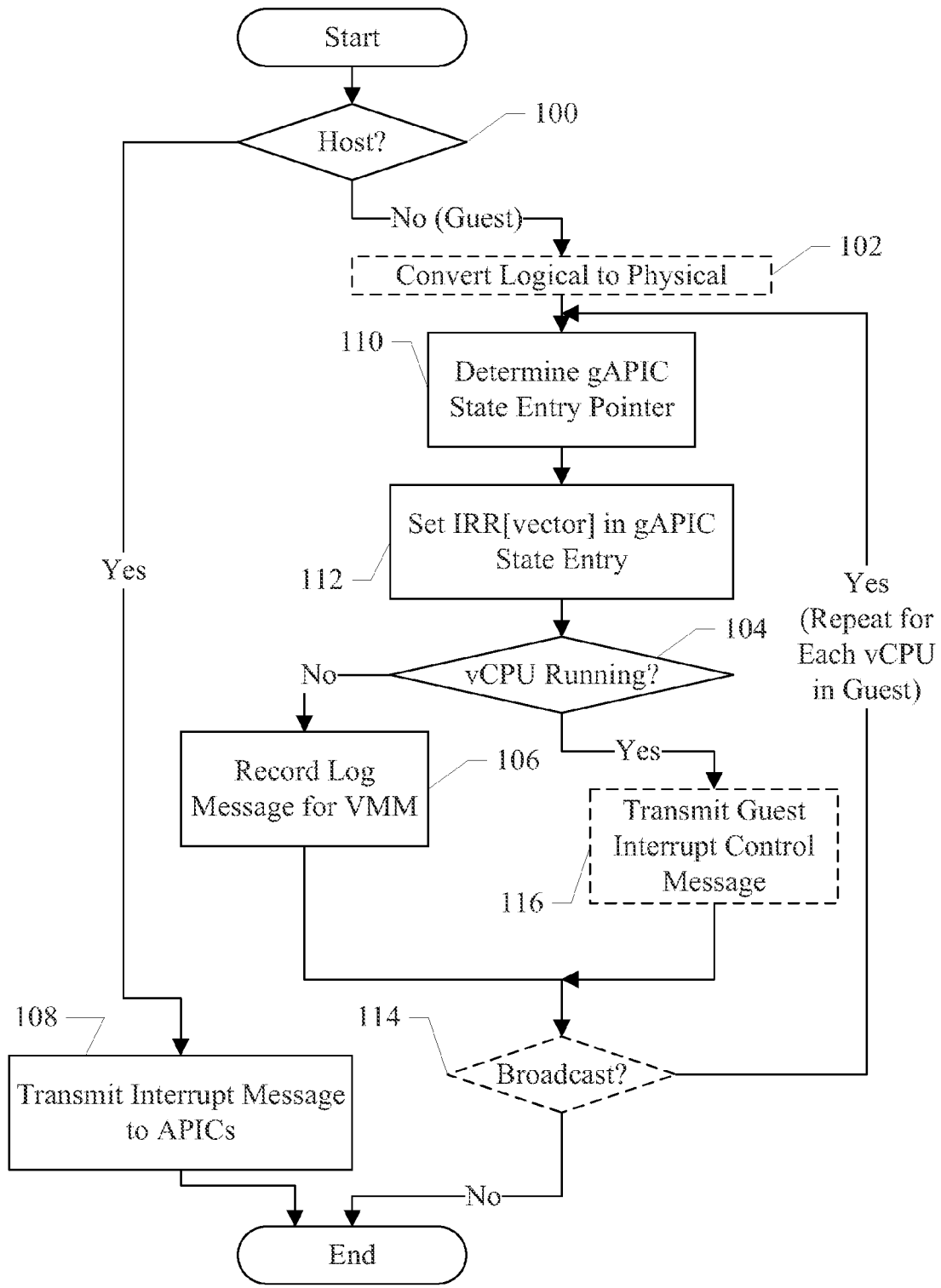
FIG. 7 is a flowchart illustrating operation of one embodiment of a device interrupt manager shown in FIG. 2 in response to receiving an interrupt from a device.

Turning next to FIG. 7, a flowchart is shown illustrating operation of one embodiment of the device interrupt manager 38 in response to receiving an interrupt message from a peripheral device. While the blocks are shown in a particular order for ease of understanding, other orders may be used. Blocks may be performed in parallel in combinatorial logic in the device interrupt manager 38. Blocks, combinations of blocks, and/or the flowchart may be pipelined over multiple clock cycles. Generally, the device interrupt manager 38 may be configured to implement the operation illustrated in FIG. 7.

The device interrupt manager 38 may access the device table 62 and the interrupt remapping table 64 in response to the BDF and interrupt information received from the peripheral device. The device interrupt manager 38 may receive the G/H indication from the interrupt remapping table 64, and if the interrupt is for the host (decision block 100, "yes" leg), the device interrupt manager 38 may transmit the interrupt message with the (possibly remapped) destination ID and vector to the APICs 32A-32B (block 108).

If the device interrupt is for the guest according the G/H indication (decision block 100, "no" leg), the device interrupt manager 38 may record the interrupt in the gAPIC state entry for the guest/vCPU. In some embodiments that support logical APIC IDs for the device interrupts, the device interrupt manager 38 may convert the logical APIC ID to a physical APIC ID through the logical APIC ID table 60B (block 102).

The device interrupt manager 38 may be configured to determine the gAPIC state entry pointer from the physical APIC ID table 60A, using the AIDTP from the device table 62 and the physical APIC ID for the device interrupt (block 110). The device interrupt manager 38 may be configured to set the bit corresponding to the interrupt vector in the IRR represented in the gAPIC state entry 90 (block 112). Additionally, the device interrupt manager 38 may use the IR indication from the physical APIC ID table 60A to determine if vCPU targeted by the interrupt is running (decision block 104). If the vCPU is not running (decision block 104, "no" leg), the device interrupt manager 38 may record a log message for the VMM 18, e.g. in an event queue (block 106). The VMM 18 may subsequently process the log message to schedule the vCPU. Other embodiments may communicate the receipt of an interrupt for a non-running vCPU in other fashions. If the vCPU is running (decision block 104, "yes" leg), the guest interrupt control unit 34A-34B in the processor 30A-30B that is running the vCPU may detect the update of the IRR bit (block 112) using the watch region mechanism. In another embodiment, the device interrupt manager 38 may transmit a guest interrupt control message to the processor 30A-30B to indicate the receipt of the guest interrupt (block 116).

Physical interrupts may be broadcast or single destination. If the physical interrupt is broadcast (decision block 114, "yes" leg), the device interrupt manager 38 may be configured to repeat blocks 110, 112, 104, 106, and 116 for each destination in the guest's virtual machine (e.g. each vCPU). Alternatively, physical interrupts that are broadcast may be handled by the device interrupt manager 38 by logging the interrupt in a data structure accessible to the VMM 18 (e.g. an event queue). The device interrupt manager 38 may also be configured to signal the VMM 18 (e.g. causing an exit from a virtual machine on one of the processors 30A-30B) to inform the VMM 18 of the event. Alternatively, the device interrupt manager 38 may only signal the VMM 18 periodically (e.g. once every N milliseconds and/or at a high watermark in the event queue) and the VMM 18 may check the event queue periodically as well to service any events more rapidly than the signalling might support. In one embodiment, the event queue may be managed by the IOMMU 40 instead of the device interrupt manager 38. Similar mechanisms may be implemented for multicast logical interrupts, repeating blocks 102, 110, 112, 104, 106, and 116 for each destination in the vector portion of the logical APIC ID of the interrupt.

FIGS. 8-11 are flowcharts illustrating operation of one embodiment of the processors 30A-30B (and more particularly the guest interrupt control units 34A-34B) in response to various instructions and/or other events in the computer system 5. The guest interrupt control units 34A-34B may be configured to implement the operation illustrated in each flowchart. As mentioned previously, some or all of the guest interrupt control units 34A-34B may be implemented in microcode. In such embodiments, the guest interrupt control units 34A-34B may be configured to implement the operation by dispatching the microcode for execution in the processor. While the blocks are shown in the flowchart in a particular order for ease of understanding, other orders may be used. Blocks may be performed in parallel in combinatorial logic in the guest interrupt control units 34A-34B. Blocks, combinations of blocks, and/or the flowchart as a whole may pipelined over multiple clock cycles.

Figures 8, 9:
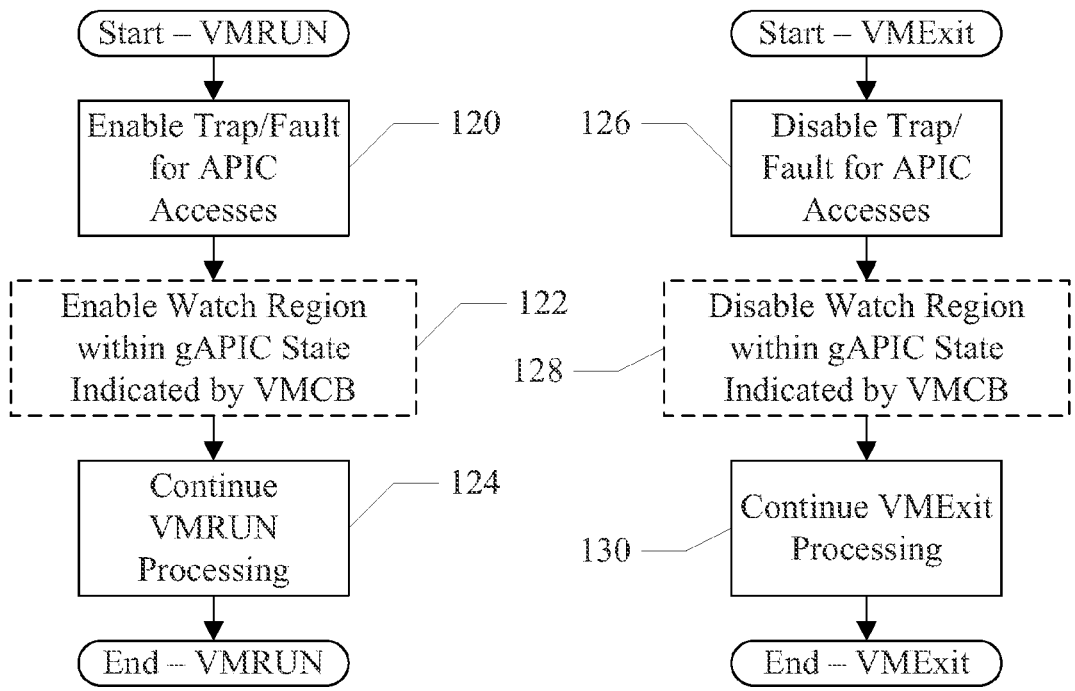
FIG. 8 is a flowchart illustrating operation of one embodiment of a processor shown in FIG. 2 in response to a virtual machine run (VMRUN) instruction.
FIG. 9 is a flowchart illustrating operation of one embodiment of a processor shown in FIG. 2 in response to a virtual machine exit (VMExit).

FIG. 8 illustrates operation of a guest interrupt control unit 34A-34B in a processor 30A-30B in response to the processor executing a VMRUN instruction, for one embodiment. The guest interrupt control unit may enable trap/fault operation for APIC accesses in the processor (block 120). The processor hardware may be configured to convert the APIC accesses into memory accesses to the gAPIC state entry 90 for the vCPU in this embodiment, or the APIC accesses may be implemented in microcode. Many of the gAPIC accesses may be trapped on retire to permit the VMM to emulate any side effects, if needed. However, some operations may perform unrecoverable changes to the gAPIC state, and such accesses may be faulted and performed in the VMM. In one embodiment, the guest interrupt state may be reevaluated (e.g. to detect delivery of an interrupt during a time that the vCPU was not running) The operation of FIG. 10 may be implemented as part of the VMRUN instruction, for example.

If watch region operation is implemented, the guest interrupt control unit may enable the watch region over the IRR bits in the gAPIC state entry 90 (block 122). For example, guest interrupt control unit may use the gAPIC state entry pointer from the VMCB 22 to read one or more cache blocks in the gAPIC state entry 90 that cover the IRR bits into the cache, and may begin monitoring of updates to the cache blocks. Other embodiments may implement the guest interrupt control message to signal that guest interrupts have been received for the vCPU, and the watch region may not be implemented.

The processor may perform various other processing that is performed in response to the VMRUN instruction (block 124). For example, various processor state that is loaded from the VMCB 22 may be loaded, processor state may be saved to the VMM state save area, etc. The operation of block 124 may occur before, after, and/or interleaved with the blocks 120 and 122, in some embodiments.

FIG. 9 illustrates operation in response to a VMExit from a guest, for one embodiment. The guest interrupt control unit may disable the trap/fault behavior for APIC accesses (block 126). Additionally, if watch region operation is used to detect interrupts being received for the vCPU, the watch region may be disabled (block 128), and the processor may continue with other VMExit processing (e.g. saving state to the VMCB 22, restoring VMM 18 state, etc.) (block 130). The operation of block 130 may occur before, after, and/or interleaved with the blocks 126 and 128, in some embodiments.

Figure 10:
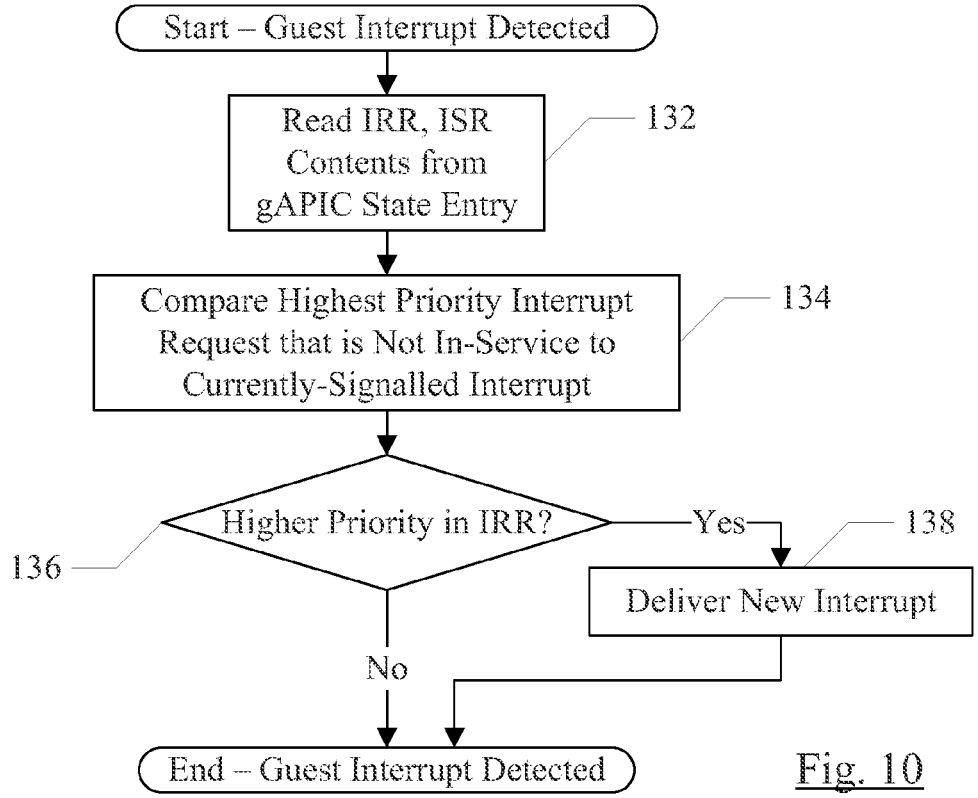
FIG. 10 is a flowchart illustrating operation of one embodiment of a processor shown in FIG. 2 in response to detecting a guest interrupt for a guest executing on the processor.

Turning now to FIG. 10, a flowchart is shown illustrating operation of one embodiment of the guest interrupt control unit in response to the processor detecting a guest interrupt for the vCPU executing on the processor. The guest interrupt may be detected in various fashions: detecting an update in the watch region; receiving a guest interrupt control message; etc.

The guest interrupt control unit may read the IRR and ISR data contents from the gAPIC state entry 90 for the vCPU (block 132). If the guest TPR is not implemented in the processor, the TPR may be read as well. The guest interrupt control unit may compare the highest priority interrupt recorded in the IRR that is not in-service to the currently-delivered interrupt in the vCPU and to the current TPR (block 134). If the highest priority interrupt is higher priority than the TPR and the highest priority in-service interrupt (decision block 136, "yes" leg), the guest interrupt control unit may deliver the new higher priority interrupt to the vCPU (block 138). The mechanism for injecting the interrupt into the guest may vary in various embodiments. As mentioned previously, the processor may include hardware for queuing a guest interrupt to interrupt the guest during execution. The guest interrupt control unit may load the hardware with the information for the higher priority interrupt in such an embodiment.

For embodiments of the guest interrupt control unit that implement the operation of FIG. 10 in microcode, the detection of the guest interrupt may cause a trap to microcode. The trap, in this case, may not be directly related to the instruction that is trapped on. However, the trap may permit the microcode to execute and take the interrupt. The microcode may be executed to implement the operation illustrated in FIG. 10 in response to the trap.

Figure 11:
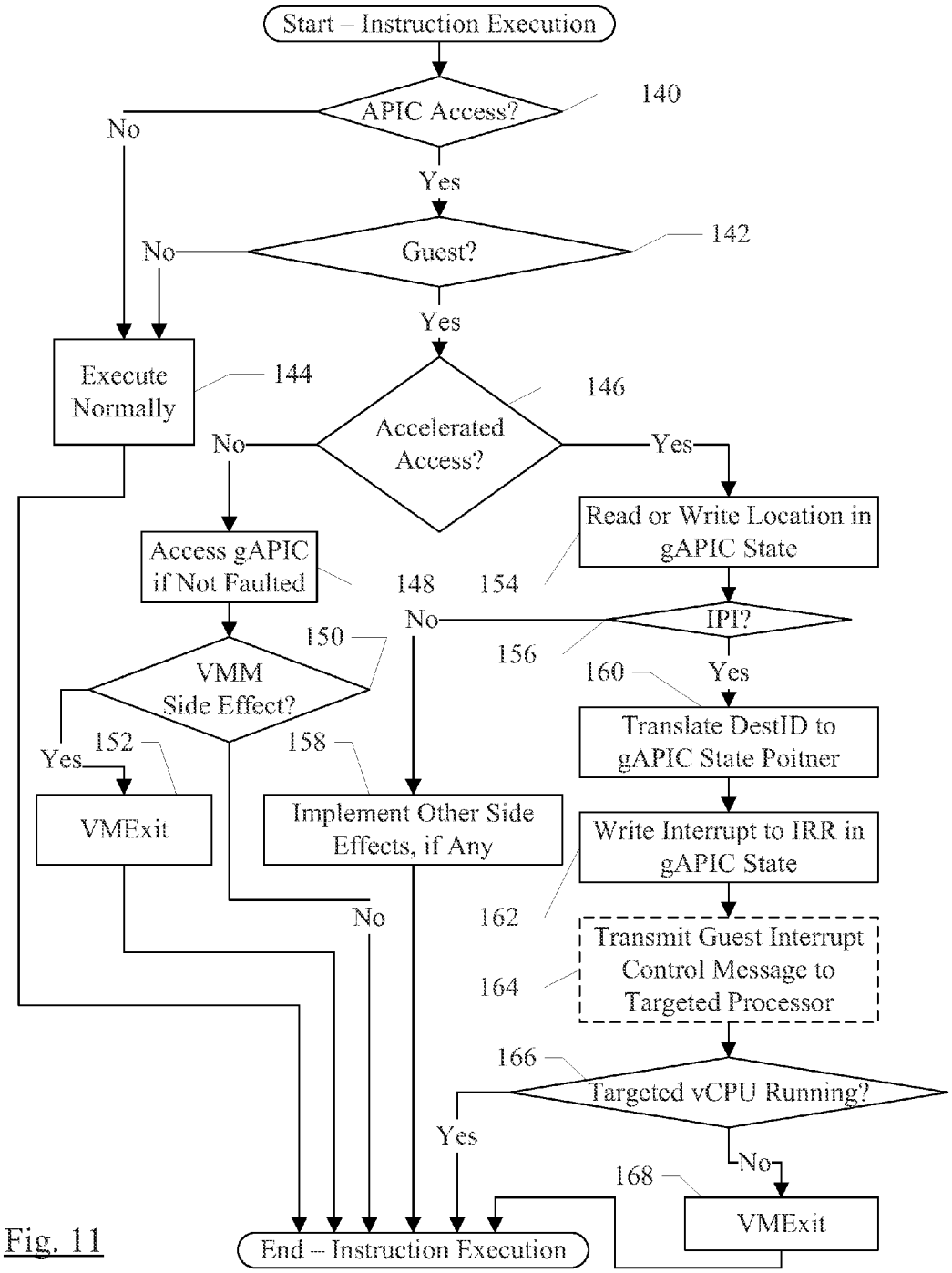
FIG. 11 is a flowchart illustrating operation of one embodiment of a processor shown in FIG. 2 in response to a general instruction.

FIG. 11 is a flowchart illustrating operation of one embodiment of the guest interrupt control unit for instruction execution in the vCPU on the processor that includes guest interrupt control unit. If the instruction is not an APIC access (decision block 140, "no" leg), or is an APIC access (decision block 140, "yes" leg) and the processor is not executing a guest (i.e. the processor is executing the host—decision block 142, "no" leg), the guest interrupt control unit may take no action and the instruction may be executed normally (block 144). In this context, executing normally may refer to executing without interference from the guest interrupt control unit. The instruction may still be intercepted via the intercept configuration in the guest, may experience exceptions, etc.

If the instruction is an APIC access (decision block 140, "yes" leg) and is in guest execution (decision block 142, "yes" leg), the guest interrupt control unit may determine if the access is an accelerated access (decision block 146). An accelerated access may be an access that is implemented by the guest interrupt control unit, including any side effects that may be caused by the access. In one embodiment, the accesses may be implemented in microcode, including any side effects. If the access is not an accelerated access, the guest interrupt control unit may perform the access to the gAPIC state entry if the instruction is trapped (not faulted) (block 148). As mentioned previously, most instructions may be trapped. Instructions that are faulted may be instructions which cause unrecoverable state change if permitted to retire. For example, writes to the IRR, ISR, and optionally the TMR may be faulted because interrupt state could be overwritten by these instructions. Additionally, in an embodiment, accesses to the current count register may be faulted for emulation, since the current count register is a free running counter operating according to a clock supplied to the integrated circuit 66. The overhead of virtualization may be detectable in the counter if it is not emulated. Other accesses may be trapped. Other embodiments may make different delineations of trapped and faulted instructions.

If the VMM 18 emulates one or more side effects of the operation (decision block 150, "yes" leg), the guest interrupt control unit may VMExit to the VMM 18 (block 152). Some accesses may have no side effects (e.g. most read operations). Write operations and some read operations may have side effects (e.g. operation of the APIC that is expected in response to the write), and these side effects may be emulated in the VMM 18. In this context, a side effect may be any operation other than updating the state (for a write) or the target register (for a read). If there are no side effects emulated by the VMM 18 (decision block 150, "no" leg), operation for the instruction may be complete.

If the access is accelerated (decision block 146, "yes" leg), the guest interrupt control unit may read or write the location in the gAPIC state entry that corresponds to the register that is accessed by the instruction (block 154). The set of accesses that are accelerated may vary from embodiment to embodiment. Generally, accesses that may occur frequently and/or may otherwise be performance critical may be candidates for acceleration. In one embodiment, accesses to the ICRL (which may cause an IPI), the TPR, and the EOI register may be accelerated. If the access is to the TPR or EOI, or the access is to the ICRL but does not cause an IPI (decision block 156, "no" leg), the guest interrupt control unit may implement any other side effects (if any) and the instruction may be completed (block 158). If the instruction causes an IPI (decision block 156, "yes" leg), the guest interrupt control unit may use the APIC ID tables 60 to translate the destination ID of the IPI to a gAPIC state pointer for the targeted vCPU (block 160). The base addresses of the logical APIC ID table 60B and the physical APIC ID table 60A may be available from the VMCB 22, and may have been loaded into the processor when the vCPU executing on the processor was invoked. The guest interrupt control unit may write the IRR in the gAPIC state to record the IPI (block 162). If guest interrupt control messages are used to communicate that an interrupt has been recorded and the targeted vCPU is running, the guest interrupt control unit may transmit the guest interrupt control message to the targeted processor (block 164). If the targeted vCPU is not running (decision block 166, "no" leg), the processor may VMExit to permit the VMM 18 to schedule the targeted vCPU (block 168).

Similar to the discussion above for broadcast physical interrupts with regard to FIG. 7, if the IPI is broadcast (physical) or has multiple targets (logical), the guest interrupt control unit may either support the multiple targets by updating multiple gAPIC state entries or may exit to the VMM 18 for multiple-target IPIs.

Figure 16:
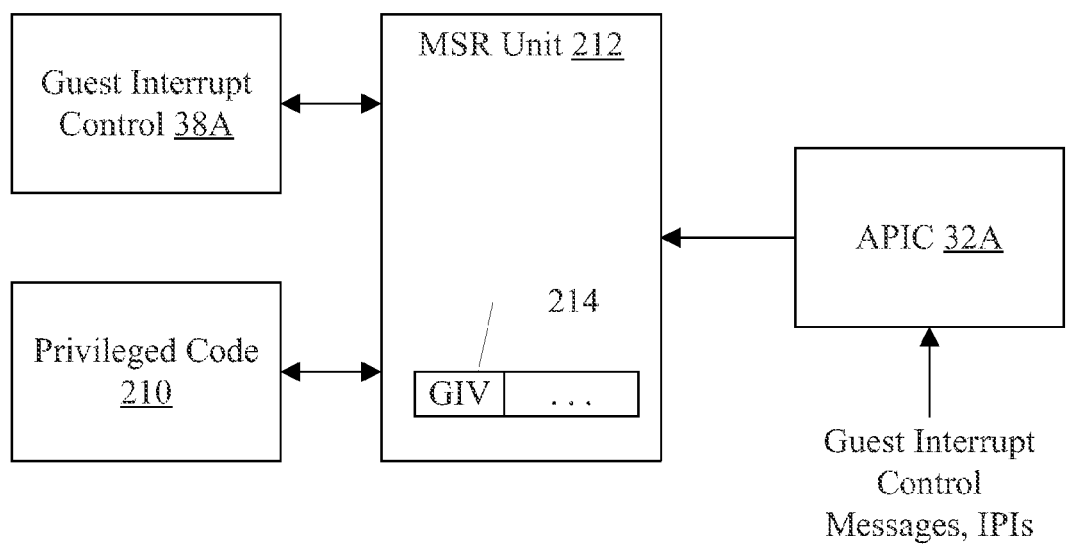
FIG. 16 is a block diagram illustrating one embodiment of a model specific register (MSR) interface for delivering guest interrupt control messages to a guest interrupt control unit in a processor.

FIG. 16 is a block diagram illustrating one embodiment of an MSR interface that may be used to deliver a guest interrupt control message (and guest IPIs) to the guest interrupt control unit 38A in the processor 30A. Illustrated in FIG. 16 are the guest interrupt control unit 38A and an MSR unit 212 (both of which may be part of the processor 30A), privileged code 210, and the APIC 32A. The guest interrupt control unit 38A is coupled to the MSR unit 212, which includes an MSR 214. The MSR 214 may store a guest interrupt valid (GIV) bit. Other interrupt-related data may be stored in the MSR 214 as well. The MSR unit 212 is coupled to the APIC 32A.

Accordingly, the APIC 32A may receive a guest interrupt control message and may be configured to transmit an update for the MSR 214. The update may set the GIV bit. Responsive to the set GIV bit, the guest interrupt control unit 38A may process the received guest interrupt (e.g. as shown in FIG. 10). The setting of the GIV bit may cause circuitry in the guest interrupt control unit 38A to initiate processing of the guest interrupt. Alternatively, the setting of the GIV bit may cause the issuance of microcode from the guest interrupt control unit 38A to initiate processing of the guest interrupt.

As mentioned previously, privileged code 210 may access the MSR unit 212 (including the MSR 214). The privileged code 210 may include the VMM 18 as well as other privileged code that may execute on the processor 30A (e.g. host OS code, etc.). However, non-privileged code and guest code may not access the MSR 214.

Figure 12:
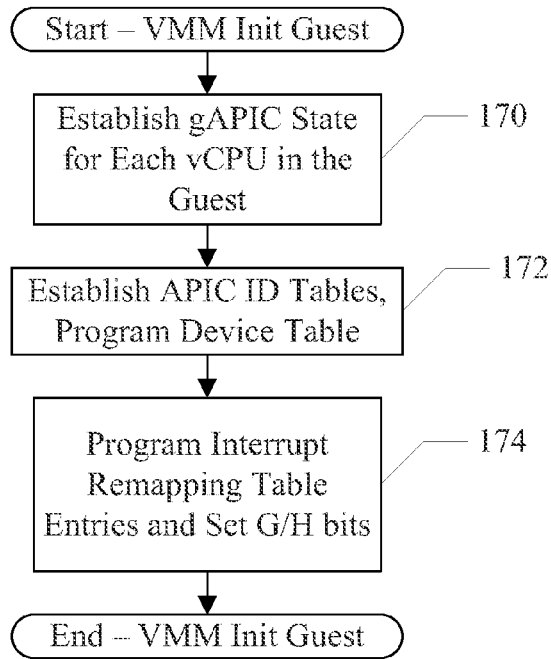
FIG. 12 is a flowchart illustrating one embodiment of a VMM to initialize a guest.
Figure 13:
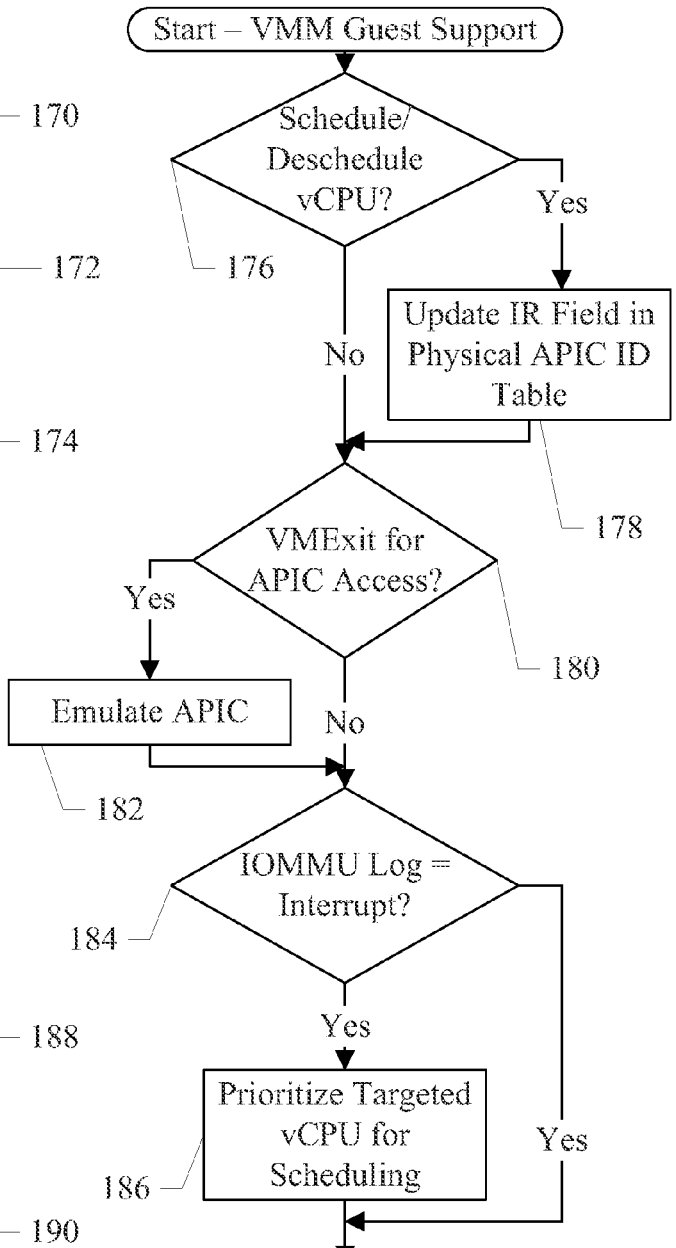
FIG. 13 is a flowchart illustrating one embodiment of a VMM to provide guest support during execution of the guest.
Figure 14:
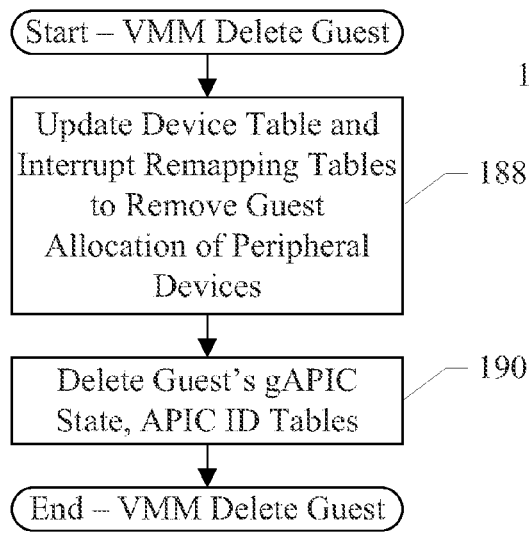
FIG. 14 is a flowchart illustrating one embodiment of a VMM to delete a guest.

FIGS. 12-14 are flowcharts illustrating high level operation of one embodiment of the VMM 18 to support guest interrupt virtualization using the hardware described previously. Many other operations implemented by the VMM 18 are not illustrated in these flowcharts, and portions of those various other operations may be interleaved with the illustrated operations and/or may be performed before and/or after the illustrated operations. While the blocks are shown in the flowchart in a particular order for ease of understanding, other orders may be used. The VMM 18 may include instructions which, when executed, implement the operation illustrated in the flowcharts.

FIG. 12 is a flowchart illustrating one embodiment of operation of the VMM 18 during initialization of a guest for execution on the computer system 5. That is, the initialization may include creating the data structures that describe the virtual machine for the guest, prior to executing the guest on the computer system 5. The VMM 18 may establish the gAPIC state for each vCPU in the guest (block 170). Establishing the gAPIC state may, e.g., include allocating a page for the state and inserting initial values for the state. The initial values may correspond, e.g., to a reset state of an APIC.

The VMM 18 may establish the APIC ID tables 60 for the guest, mapping the gAPIC state entry pointers to the allocated pages for the guest based on the APIC ID of each vCPU (block 172). The VMM 18 may also initialize the IR indications to indicate not running. For any peripheral devices that may be assigned to the guest, the VMM 18 may program the device table 62 with pointers to the interrupt remapping table 64 and the physical APIC ID table 60B. The VMM 18 may program the interrupt remapping table 64 for the guest and setting the G/H bits to indicate guest (block 174).

FIG. 13 is a flowchart illustrating one embodiment of operation of the VMM 18 to support the guest for interrupt virtualization after the initialization is completed. If the VMM 18 schedules the guest for execution or deschedules a vCPU of the guest (decision block 176, "yes" leg), the VMM 18 may update the IR field in the entry of the physical APIC ID table 60A that corresponds to that vCPU to indicate running (guest scheduled) or not running (guest descheduled) (block 178). If a VMExit is detected for an APIC access (decision block 180, "yes" leg), the VMM 18 may emulate the APIC access based on the gAPIC state (block 182). If the VMM 18 detects a log entry from the IOMMU 40 indicating that an interrupt has been received that targets a vCPU that is not running (decision block 184, "yes" leg), the VMM 18 may prioritize the targeted vCPU for scheduling to handle the interrupt (block 186).

FIG. 14 is a flowchart illustrating operation of one embodiment of the VMM 18 to delete a guest from the system. The VMM 18 may update the device table 62 and interrupt remapping tables 64 to remove the guest allocation of any peripheral devices (block 188). The VMM 18 may also delete the guest's gAPIC state entries 90 and APIC ID tables 60 (block 190).

Figure 15:
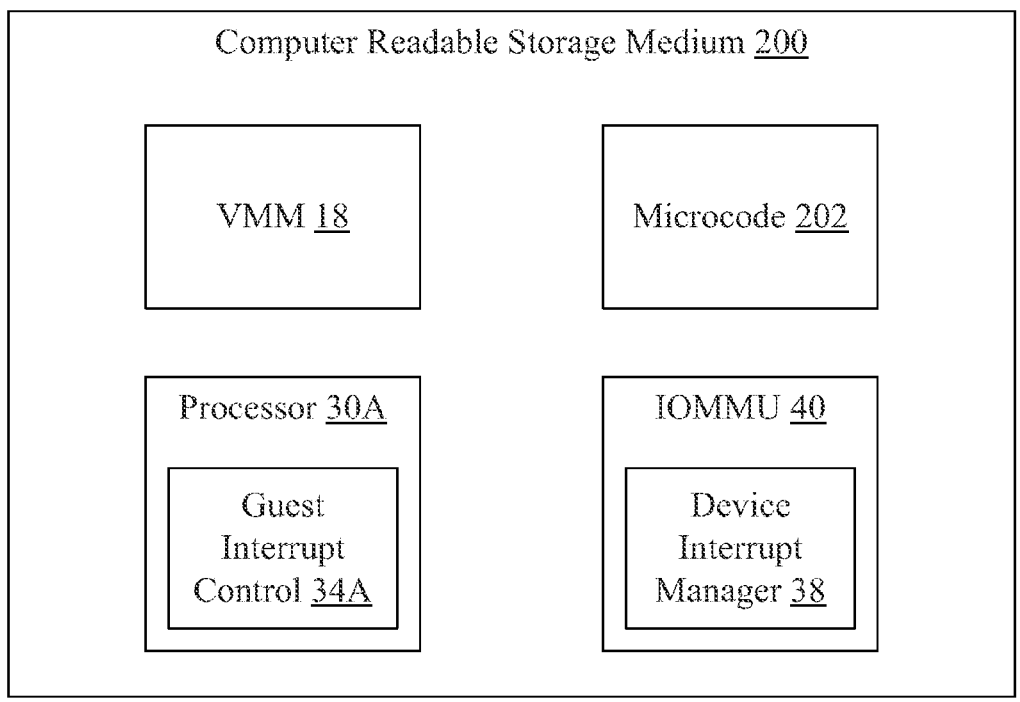
FIG. 15 is a block diagram of one embodiment of a computer readable storage medium storing one embodiment of a VMM and/or microcode.

Turning next to FIG. 15, a block diagram of a computer readable storage medium 200 is shown. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, HDDVD, and/or Blu-Ray discs. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface or any other interface, etc. Storage media may include microelectromechanical systems (MEMS), as well as storage media accessible via a communication medium such as a network and/or a wireless link. The computer readable storage medium 200 in FIG. 15 may store the VMM 18, which may implement all or a portion of the operation illustrated in the flowcharts of FIGS. 12-14 and/or any other functionality assigned to the VMM 18 in this description. The computer readable storage medium 200 may store microcode 202 or other instructions and/or data (e.g., Verilog or some other hardware description language), which may implement all or a portion of the operation illustrated in the flowcharts of FIGS. 8-13 for portions of the guest interrupt control unit 34A that are implemented in microcode and/or any other functionality assigned to the microcode in this description. Generally, the computer readable storage medium 200 may store any set of instructions which, when executed, implement a portion or all of the flowchart shown in FIGS. 8-13. In some embodiments, a portion or all of the operation described herein for the processor 30A (and more particularly the guest interrupt control unit 34A) may be implemented in hardware and similarly the IOMMU 40 (and more particularly the device interrupt manager 38) may be implemented in hardware. The computer readable storage medium 200 may store any desired representation of such hardware. For example, the representation may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the representation on the computer accessible storage medium 300 may be the netlist (with or without the synthesis library) or the data set, as desired. Instructions may be used to configure a circuit fabrication facility through, for example, the generation of mask works that, when so configured, the fabrication facility is adapted to produce integrated circuits which implement a portion or all of the operation described in the flowcharts of FIGS. 8-13 and/or a portion or all of the operation described herein for the processor 30A, the guest interrupt control unit 34A, the IOMMU 40, and/or the device interrupt manger 38. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A computer readable storage medium storing a plurality of instructions which, when executed on a computer:
   read a first memory location in a memory system, wherein the first memory location stores a log of events detected in the computer, wherein the log of events is updated by a hardware device interrupt manager in the computer responsive to the hardware device interrupt manager recording an interrupt in a second memory location in the memory system, wherein the second memory location is assigned to store interrupt data corresponding to a virtual processor in a virtual machine executing on the computer, wherein the hardware device interrupt manager is configured to receive the interrupt and to determine that the interrupt is targeted at the virtual processor, and wherein the interrupt is sourced by a device that is assigned to the virtual machine, wherein the hardware device interrupt manager is configured to update the log of events with a message indicating that the interrupt has been recorded in the second memory location responsive to recording the interrupt in the second memory location at a time when the virtual processor is not active; and
   schedule the virtual processor for execution on a hardware processor in the computer responsive to detecting the message in the log of events, wherein the virtual processor is scheduled in order to service the interrupt.

2. The computer readable storage medium as recited in claim 1 wherein the instructions which, when executed, schedule the virtual processor comprise instructions which, when executed, update one or more tables which map interrupts to virtual processors to indicate that the virtual processor is active.

3. The computer readable storage medium as recited in claim 2 wherein the one or more tables further include data identifying the second memory location in the memory system.

4. The computer readable storage medium as recited in claim 3 wherein the data is a pointer to the second memory location.

5. The computer readable storage medium as recited in claim 2 further storing instructions which, when executed, deschedule the virtual processor and update the one or more tables to indicate that the virtual processor is not active.

6. The computer readable storage medium as recited in claim 5 further storing instructions which, when executed, manage the data in the one or more tables as devices are assigned to guests.

7. The computer readable storage medium as recited in claim 6 wherein the instructions which, when executed, manage the data comprise instructions which, when executed:
   assign a device to a given guest; and
   update a device table entry associated with the device to locate the one or more tables in memory.

8. A method comprising:
   updating a first memory location in a memory system of a computer system, the updating by a hardware device interrupt manager in the computer system, wherein the first memory location stores a log of events detected in the computer, and wherein the updating is responsive to the hardware device interrupt manager recording an interrupt in a second memory location in the memory system, wherein the second memory location is assigned to store interrupt data corresponding to a virtual processor in a virtual machine executing on the computer, wherein the hardware device interrupt manager is configured to update the log of events with a message indicating that the interrupt has been recorded in the second memory location responsive to recording the interrupt in the second memory location at a time when the virtual processor is not active;
   reading the first memory location; and
   scheduling the virtual processor for execution on a hardware processor in the computer responsive to the message in the log of events, wherein the virtual processor is scheduled in order to service the interrupt.

9. The method as recited in claim 8 further comprising:
   the hardware device interrupt manager receiving the interrupt; and
   the hardware device interrupt manager determining that the interrupt is targeted at the virtual processor, and wherein the interrupt is sourced by a device that is assigned to the virtual machine.

10. The method as recited in claim 8 further comprising updating one or more tables which map interrupts to virtual processors to indicate that the virtual processor is active responsive to scheduling the virtual processor.

11. The method as recited in claim 10 wherein the one or more tables further include data identifying the second memory location in the memory system.

12. The method as recited in claim 11 wherein the data is a pointer to the second memory location.

13. The method as recited in claim 10 further comprising:
   descheduling the virtual processor; and
   updating the one or more tables to indicate that the virtual processor is not active responsive to the descheduling.

14. The computer readable storage medium as recited in claim 13 further comprising managing the data in the one or more tables as devices are assigned to guests.

15. The method as recited in claim 10 wherein managing the data comprises:
   assigning a device to a given guest; and
   updating a device table entry associated with the device to locate the one or more tables in memory.

16. A computer comprising:
   one or more hardware processors;
   a hardware device interrupt manager;
   a memory controller configured to couple to a memory, wherein the memory controller is coupled to receive memory operations from the hardware device interrupt manager and the one or more hardware processors; and
   a computer readable storage medium storing a plurality of instructions which, when executed by the one or more hardware processors:
     read a first memory location in the memory, wherein the first memory location stores a log of events detected in the computer, wherein the log of events is updated by the hardware device interrupt manager responsive to the hardware device interrupt manager recording an interrupt in a second memory location in the memory, wherein the second memory location is assigned to store interrupt data corresponding to a virtual processor in a virtual machine executing on the computer, wherein the hardware device interrupt manager is configured to receive the interrupt and to determine that the interrupt is targeted at the virtual processor, and wherein the interrupt is sourced by a device that is assigned to the virtual machine, wherein the hardware device interrupt manager is configured to update the log of events with a message indicating that the interrupt has been recorded in the second memory location responsive to recording the interrupt in the second memory location at a time when the virtual processor is not active; and schedule the virtual processor for execution on one of the hardware processors responsive to the message in the log of events, wherein the virtual processor is scheduled in order to service the interrupt.

17. The computer as recited in claim 16 wherein the instructions which, when executed, schedule the virtual processor comprise instructions which, when executed, update one or more tables which map interrupts to virtual processors to indicate that the virtual processor is active.

18. The computer as recited in claim 17 wherein the computer readable storage medium further stores instructions which, when executed, deschedule the virtual processor and update the one or more tables to indicate that the virtual processor is not active.

19. The computer as recited in claim 18 wherein the computer readable storage medium further stores instructions which, when executed, manage the data in the one or more tables as devices are assigned to guests.

20. The computer as recited in claim 19 wherein the instructions which, when executed, manage the data comprise instructions which, when executed:

assign a device to a given guest; and update a device table entry associated with the device to locate the one or more tables in memory.

\* \* \* \* \*